US007246315B1

(12) United States Patent
Andrieu et al.

(10) Patent No.: US 7,246,315 B1
(45) Date of Patent: Jul. 17, 2007

(54) INTERACTIVE PERSONAL NARRATIVE AGENT SYSTEM AND METHOD

(75) Inventors: Joe Andrieu, Pasadena, CA (US); Jeff Rawlings, San Ramon, CA (US)

(73) Assignee: Realtime Drama, Inc., Santa Barbara, CA (US)

(*) Notice: Subject to any disclaimer, the term of this patent is extended or adjusted under 35 U.S.C. 154(b) by 1307 days.

(21) Appl. No.: 09/723,607

(22) Filed: Nov. 28, 2000

Related U.S. Application Data

(60) Provisional application No. 60/202,882, filed on May 10, 2000.

(51) Int. Cl.
*G06F 15/00* (2006.01)

(52) U.S. Cl. ...................................... 715/706; 715/753

(58) Field of Classification Search ................ 715/706, 715/753, 745, 758
See application file for complete search history.

(56) References Cited

U.S. PATENT DOCUMENTS

| | | | |
|---|---|---|---|
| 5,100,154 A | 3/1992 | Mullins | |
| 5,604,855 A | 2/1997 | Crawford | |
| 5,657,462 A | 8/1997 | Brouwer et al. | |
| 5,692,212 A | 11/1997 | Roach | |
| 5,727,950 A | 3/1998 | Cook et al. | |
| 5,805,784 A | 9/1998 | Crawford | |
| 5,807,173 A | 9/1998 | Aoyama | |
| 5,832,483 A * | 11/1998 | Barker | 707/8 |

(Continued)

FOREIGN PATENT DOCUMENTS

EP 0159345 10/1985

(Continued)

OTHER PUBLICATIONS

Mauldin, Michael L., "Chatterbots, Tinymuds, and the Turing Test: Entering The Loebner Prize Competition", Jan. 24, 1994, Presented at AAAI-94, http://www.lazytd.com/lti/pub/aaai94.html.*

(Continued)

*Primary Examiner*—Cao (Kevin) Nguyen
(74) *Attorney, Agent, or Firm*—Townsend and Townsend and Crew LLP; Gerald T. Gray

(57) ABSTRACT

A software application and method enables a personal narrative agent (PNA) to create and manage multiple dynamic customized story experiences for a subject user in a user-observable environment having one or more objects with which the subject user may interact. The PNA selectively interacts with one or more of those objects to manipulate the environment in furtherance of the story experiences. The PNA further maintains data relating to the subject user, the environment and the multiple story experiences of the subject user. The PNA also simultaneously manages each of the story experiences which each reach its own narrative conclusion consistent with input and characteristics of the subject user and any objects selected to influence the story experiences. A unique PNA may be assigned to each of multiple users which independently manage different story opportunities for their respective users, such as to enable each of the multiple users to pursue individual stories independent from the stories of the other user. A PNA of one user may interact with a PNA of another user to negotiate a story opportunity involving the second user for the first user, and vice-versa.

73 Claims, 25 Drawing Sheets

U.S. PATENT DOCUMENTS

| | | | | |
|---|---|---|---|---|
| 5,873,057 | A | 2/1999 | Eves et al. | |
| 5,990,880 | A | 11/1999 | Huffman et al. | |
| 6,045,447 | A | 4/2000 | Yoshizawa et al. | |
| 6,201,948 | B1 * | 3/2001 | Cook et al. | 434/350 |
| 6,396,509 | B1 * | 5/2002 | Cheng | 345/706 |
| 6,505,031 | B1 * | 1/2003 | Slider et al. | 434/350 |
| 6,507,353 | B1 * | 1/2003 | Huard et al. | 345/863 |
| 6,544,040 | B1 * | 4/2003 | Brelis et al. | 434/236 |
| 6,577,328 | B2 * | 6/2003 | Matsuda et al. | 345/757 |
| 6,657,643 | B1 * | 12/2003 | Horvitz et al. | 345/764 |
| 6,676,523 | B1 * | 1/2004 | Kasai et al. | 463/43 |
| 6,734,885 | B1 * | 5/2004 | Matsuda | 345/848 |

FOREIGN PATENT DOCUMENTS

| | | |
|---|---|---|
| EP | 0270457 | 6/1988 |
| EP | 0360423 | 3/1990 |
| WO | 85/01601 | 4/1985 |
| WO | 92/05479 | 4/1992 |
| WO | 93/21586 | 10/1993 |
| WO | 95/14268 | 5/1995 |
| WO | 96/37815 | 11/1996 |
| WO | 97/12350 | 4/1997 |
| WO | 97/44766 | 11/1997 |
| WO | 97/44767 | 11/1997 |
| WO | 98/06044 | 2/1998 |
| WO | 98/47086 | 10/1998 |
| WO | 99/08205 | 2/1999 |
| WO | 99/36863 | 7/1999 |
| WO | 99/63450 | 12/1999 |
| WO | 00/14648 | 3/2000 |

OTHER PUBLICATIONS

Foner, Leonard N., “Entering Agents: A Sociological Case Study”, 1997.*

* cited by examiner

INTERACTIVE PERSONAL NARRATIVE AGENT SYSTEM AND METHOD

PRIORITY

This application claims the benefit of priority to U.S. provisional patent application No. 60/202,882, filed May 10, 2000.

BACKGROUND OF THE INVENTION

1. Field of the Invention

The invention relates to customized story experience creation and evolution, and particularly to interactive narrative utilizing a narrative agent for automatic management of personalized stories in a single or multi-player virtual environment.

2. Discussion of the Related Art

At least three general approaches to providing interactive narrative are prevalent in the art. According to a first approach espoused by the Oz group under the direction of Joseph Bates at Carnegie Mellon University, a user is allowed to make choices within the confines of a narrative presence directed by a centralized drama manager. That is, the drama manager of the Bates system directs the story from a centralized position assuming comprehensive knowledge and narrative control of all interactions in the system. According to a second approach, stories are generated from simulations of narratively causal interactions, such as is described by Chris Crawford, citation below. According to a third approach, plot graphs or nodal architectures are utilized. These systems have a limited number of predetermined story possibilities depending on how the user chooses to traverse the nodal architecture.

FIG. 1 is illustrative of the Bates system, and the first approach, and is excerpted from "Dramatic Presence", Margaret Thomas Kelso, Peter Weyhrauch and Joseph Bates, submitted to PRESENCE, and published online. The "physical world" shown in FIG. 1 is an observable environment within which a story takes place. The interactor is a user who makes choices while interacting with other characters in the physical world. The "characters" are completely computer generated and controlled objects. A centralized "drama manager" directs the actions of the characters and other objects within the physical world and communicates with the interactor through an interface using a "theory of presentation". By doing so, the drama manager attempts to guide the interactor through a predetermined narrative, while allowing the interactor to interact freely with the characters and the physical world.

FIG. 2 is illustrative of the simulation approach, or second approach, and is taken from U.S. Pat. No. 5,805,784 to Crawford. Each oval shown in FIG. 2 represents a sub-story ("SS"). A user may experience a story consisting of several sub-stories. The story is experienced as each sub-story links narratively to possible subsequent sub-stories. The interactions form a simulation of narrative possibilities, allowing the user to direct the story interactively by making selections. The overall story depends on which sub-stories are presented based on the user's actions. In this way, the story is constructed piecewise from locally connected sub-stories, as the simulation progresses.

The system described in the '784 patent does not have the concept of a larger story arc (or arcs) with which to shape a specific narrative experience. As a result, the user's overall experience may or may not include traditional narrative stages such as climax or denoument. The system described by Crawford in the '784 patent simulates a local narrative causality, but is unable to shape entire stories with traditional narrative effect.

FIG. 3 is illustrative of a nodal architecture approach, or the third approach, and is taken from Kelso, supra, at p. 5, although the approach is widely known in the art. The overall story depends on which nodes along the architecture are traversed according to selection by the user. The system is interactive since the user typically influences the story by making choices or taking actions at each node in the graph. The system is narrative in the sense that the sum and ordering of the nodes traversed is predetermined in defining story possibilities. The system is restrictive in the sense that the user follows one path of a limited predetermined set of possible paths and interaction is limited to the specific actions allowed at each node as the narrative progresses.

Each of the above conventional approaches is limited in that the user may only contemporaneously experience a single story to its narrative conclusion. In addition, none of those approaches scales well to a system involving a large number of simultaneous users interacting in a shared space.

SUMMARY OF THE INVENTION

In a first aspect of the invention, a software application enables a personal narrative agent (PNA) to create and manage multiple dynamic customized story experiences for a subject user in a user-observable environment having one or more objects with which the subject user may interact. The PNA selectively interacts with one or more of those objects to manipulate the environment in furtherance of the story experiences. The PNA further maintains data relating to the subject user, the environment and the multiple story experiences of the subject user. The PNA also simultaneously manages each of the story experiences each of which reaches its own narrative conclusion consistent with input and characteristics of the subject user and any objects selected to influence the story experiences.

In a second aspect of the invention, a software application enables a PNA to create and manage one or more dynamic customized story experiences for each of multiple users wherein a unique PNA is assigned to assist each user throughout the story experiences of the user in a user-observable environment having one or more objects with which the users may interact. A first and a second PNA which are respectively assigned to a first and a second users selectively interact with the objects to manipulate the environment in furtherance of the story experiences, including independently managing different story opportunities for the first and second users, respectively, consistent with the story experiences of the first user and the second user. The PNAs of the first and second user maintain data relating to the first and second users, respectively, and the one or more story experiences of the first and second users, and of the environment. The PNAs of the first and second users also manage each of the story experiences of the first and second users, respectively, to its own narrative conclusion consistent with input and characteristics of the first and second users and any objects selected to influence the story experiences, such as to enable each of the first and second users to pursue individual stories independent from the stories of the other user.

According to a third aspect of the invention, a software application enables multiple PNAs to create and manage one or more dynamic customized story experiences for multiple respective users, wherein a unique personal narrative agent is assigned to assist each user throughout the story experiences of the user in a user-observable environment having one or more objects with which the users may interact. The PNA of a first user selectively interacts with one or more of those objects and a second PNA which is assigned to a second user to manipulate the environment in furtherance of the story experiences of the first user, including negotiating a story opportunity involving the second user for the first user with the second PNA consistent with the story experiences of the first user and one or more story experiences of the second user. The first PNA also maintains data relating to the first user, the second user, the one of more story experiences of the first user, and the environment. The PNA of the first user further manages the story experiences of the first user to a narrative conclusion consistent with input and characteristics of the first user and any objects selected to influence the story experiences.

In a fourth aspect of the invention, a software application enables a PNA to generate a story for a user according to a first narrative form. The PNA then determines or identifies events tending to cause the story to be inconsistent with the first narrative form. Then, the PNA transforms the story to an instance of a second narrative form for which the events are consistent.

In a fifth aspect of the invention, a software application includes a story selector component for selecting stories for a user. The story selector analyzes the user's actions in a storyenvironment, and determines which stories from a set of known stories contain similar actions. The story selector then creates a plan for the future continuation of the user's story.

According to a sixth aspect of the invention, a software application enables multiple PNAs to create and manage one or more dynamic customized story experiences for multiple respective users, wherein a unique personal narrative agent is assigned to assist each user throughout the story experiences of the user in a user-observable environment having one or more objects with which the users may interact. The PNA of a first user selectively interacts with one or more of those objects and a second PNA which is assigned to a second user to manipulate the environment in furtherance of the story experiences of the first user, including negotiating with the second PNA for the use of one or more objects which, depending on the negotiation, may be used in one or both of the first and second users' stories. The first PNA also maintains data relating to the first user, the one or more objects subject to the negotiation, the one of more story experiences of the first user, and the environment. The PNA of the first user further manages the story experiences of the first user to a narrative conclusion consistent with input and characteristics of the first user and any objects selected to influence the story experiences, including any objects determined from the negotiation to influence the story experiences.

In a seventh aspect of the invention, a business method is set forth wherein a software application enables a personal narrative agent (PNA) to create and manage one or more dynamic customized story experiences for a subject user in a user-observable environment having one or more objects with which the subject user may interact. The PNA selectively interacts with one or more of those objects to manipulate the environment in furtherance of the story experiences. Each object interaction is associated with a value that the PNA and/or subject user is prompted to agree to prior to use of that object being enabled for interaction. There may be a negotiation involving the subject user and/or the PNA for determining the value of an object.

In addition, a negotiation may occur between the PNA of the subject user and a second PNA associated with a second user for the use of one or more objects that are the subject of contention between the respective PNAs. The negotiation may involve bidding or auctioning of the contended-for objects to determine the value of the objects with respect to object interaction in a story experience of either or both of the subject and second users. The negotiation may include input from either or both of the subject and second users. Depending on the outcome of the negotiation, an object may be used in one or both of the first and second users' stories.

According to the seventh aspect of the invention, the first PNA also preferably maintains data relating to the subject user, the one or more objects subject to the negotiation, the one of more story experiences of the subject user, and the environment. The PNA of the first user further preferably manages the one or more story experiences of the subject user to a narrative conclusion consistent with input and characteristics of the subject user and any objects selected to influence the story experiences, including any objects determined from the negotiation to influence the story experiences.

BRIEF DESCRIPTION OF THE DRAWINGS

FIGS. 9*a*–9*c* schematically illustrate single user and multi-user embodiments.

INCORPORATION BY REFERENCE

Figure 1:
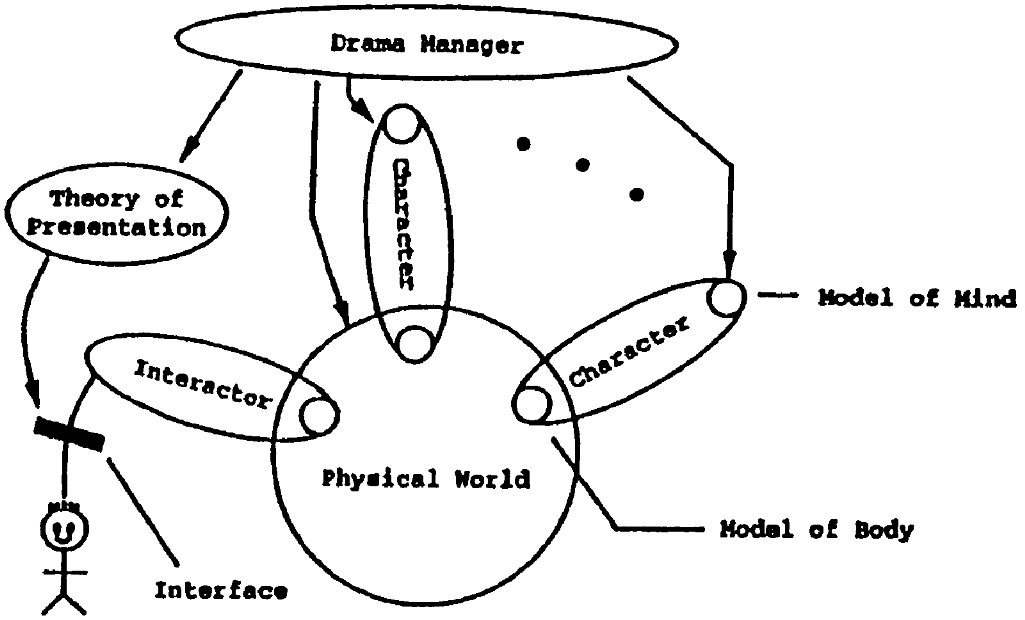
FIG. 1 (PRIOR ART)
FIG. 1 schematically illustrates the Bates system of interactive narrative.

What follows is a cite list of references each of which is, in addition to the reference cited in the priority section, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references, and discussion thereof, cited in the background above are also incorporated by reference into the detailed description of the preferred embodiments with the same effect as just described with respect to the following references:

M. T. Kelso et al., Dramatic Presence, Presence, The Journal of Teleoperators and Virtual Environments, MIT Press, 1992;

J. Bates, Virtual Reality, Art, and Entertainment, Presence, The Journal of Teleoperators and Virtual Environments, MIT Press, 1991;

M. Mateas, Not Your Grandmother's Game: AI-Based Art and Entertainment;

Phoebe Sengers' home page [http://www.cs.cmu.edu/hoebe];

PCT/IB97/01271, Autonomous Compound Agents, Filed 13 October 1997.

U.S. Pat. No. 5,805,784, Computer Story Generation System and Method Using Network of Reusable Substories, Issued Sep. 8, 1998.

Bringsjord & Ferrucci, Artificial Intelligence and Literary Creativity;

C. Kline et al., The Art and Science of Synthetic Character Design;

S. Smith et al., Towards a Theory of Narrative for Interactive Fiction, Feb. 20, 1989;

M. Kantrowitz, GLINDA: Natural Language Text Generation in the Oz Interactive Fiction Project, July 1990;

M. Kantrowitz et al., Integrated Natural Language Generation Systems, April 1992;

A. B. Loyall et al., Hap A Reactive, Adaptive Architecture for Agents, Jun. 24, 1991;

W. S. Reilly et al., Building Emotional Agents, May 1992;

J. Bates et a I., An Architecture for Action, Emotion, and Social Behavior May 1992;

J. Bates et al., Integrating Reactivity, Goals, and Emotion in a Broad Agent, May 1992;

J. Bates et al., Broad Agents;

A. B. Loyall et al., Real-time Control of Animated Broad Agents;

J. Bates, The Role of Emotion in Believable Agents, April 1994;

W. S. Reilly, Natural Negotiation for Believable Agents, June 1995;

A. B. Loyall et al., Personality-Rich Believable Agents That Use Language;

J. Bates, The Nature of Characters in Interactive Worlds and The Oz Project, October 1992;

A. B. Loyall et al., Personality-Rich Believable Agents That Use Language;

J. Altucher, Interactive Fiction, Bulletin of the American Society for Information Science, October/November 1992;

J. Bates, The Role of Emotion in Believable Agents, Communications of the ACM, July 1994, Vol. 37, No. 7;

N. M. Sgouros, Dynamic generation, management and resolution of interactive plots, Artificial Intelligence, 107 (1999);

N. M. Sgouros, Determining the Visual Interpretation of Actions in Multimedia Presentations of Interactive Stories, Journal of Intelligent and Robotic Systems, Vol. 26, pp. 187–197, 1999;

W. S. N. Reilly, Believable Social and Emotional Agents, May 1996;

P. Sengers, Anti-Boxology: Agent Design in Cultural Context, August 1998;

B. Hayes-Roth et al., Directed Improvisation with Animated Puppets, Chi '95 Mosaic of Creativity, May 7–11, 1995;

C. Sandier, Multimedia Magic, HOMEPC, April 1997;

C. Elliott et al., Story-morphing in the Affective Reasoning paradigm: Generating stories semi-automatically for use with "emotionally intelligent" multimedia agents, Proceedings of the Second International Conference on Autonomous Agents, May 9–13, 1998;

Literary choice, 182 PCW, December 1986;

Artificial Intelligence and Interactive Entertainment, Papers from the 2000 AAI Spring Symposium, Technical Report SS-00-02;

Narrative Intelligence, Papers from the 1999 AAAI Fall Symposium Technical Report FS-99-01;

Book Review of Balance of Power: International Politics as the Ultimate Global Game, BYTE May 1987, Vol. 12, No. 5;

C. Crawford, Design Techniques and Ideals for Computer Games, BYTE, December 1982;

M. Sharples, Storytelling by Computer, Digital Creativity, Vol. 8, No. 1, April 1997;

L. Cheol-Yeong et al., An Algorithm of Creating Story, Transactions of the Society of Instrument and Control Engineers, Vol. 16, No. 4, August 1980;

W. Sack et al., IDIC: Assembling Video Sequences from Story Plans and Content Annotations, International Conference on Multimedia Computing and Systems, Boston, Mass., May 14–19, 1994;

K. Moorman et al., A Model of Creative Understanding;

D. Stewart et al., Explanation Closure as a Knowledge Representation Tool for Automated Story Generation, Proceedings of the 36th annual conference on Southeast regional conference, Apr. 1–3, 1998, Marietta Ga.;

Book Review of Rare Halos, Mirages, Anomalous Rainbows and Related Electromagnetic Phenomena, SPECTRUM, December 1984;

F. Tillman, Hypermedia Fiction: A Medium of Forking Paths, Computer Assisted Language Learning, Vol. 10, No. 4, pp. 387–397, 1997;

J. R. Atwood, A multi-planner approach for generating suspense stories;

Plot Automation, The Journal of Computer Game Design, Vol. 5, No. 1, pp. 10–12, October 1991;
C. S. Pinhanez et al., Interval Scripts: a Design Paradigm for Story- Based Interactive Systems CHI 97 Electronic Publications: Papers;
Artificial Life Meets Entertainment: Lifelike Autonomous Agents Pattie Maes, Communications of the ACM, Vol. 38, No. 11, November 1995;
M. Murtaugh, The Automatist Storytelling System Putting the Editor's Knowledge in Software;
M. Mateas et al., Narrative Intelligence;
R. R. Lang, A Declarataive Model for Simple Narratives;
Media Arts Research Studies web page;
M. Mateas, An Oz-Centric Review of Interactive Drama and Believable Agents;
Interactive fiction, IEEE Intelligent Systems, November/December 1998;
A. Stern, AI Beyond Computer Games;
M. Sharples, The Use of Computers to Aid the Teaching of Creative Writing, AEDS Journal, Winter 1983;
Best Behaviors, Digital Magic, August 1996;
M. Lebowitz, Creating a Story-Telling Universe;
D. Coco, Creating Intelligent Creatures, Computer Graphics World, Vol. 20, No. 7, July 1997;
T. Fujita et al., A Story Generation Reflecting Actor's Intention, Vol. 97, No. 109 (In Japanese with an abstract);
T. Hirata et al., Self-disclosure and Community Knowledge Sharing Using Associative Representation (in Japanese with an abstract);
C. Crawford, Will Video-games Pollute Game World? (abstract from Dialog);
A. Takeuchi et al., Intelligent Tutoring System-Coordinating Mixed Initiative with Strategic Dialogue by Soft Scenario, The Transactions of the IEICE, Vol. E73, No. 3, March 1990;
U.S. Pat. Nos. 5,604,855, 5,727,950, 5,873,057, 5,692,212, 5,805,784, 6,045,447, 5,807,173, 5,657,462, 5,990,880, 5,100,154;
PCT Publications No. WO 97/12350, WO 97/44766, WO 97/44767, WO 95/14268, WO 00/14648, WO 98/06044, WO 99/08205, WO 85/01601, WO 92/05479, WO 93/21586, WO 96/37815, WO 99/63450, WO 99/36863, WO 98/47086; and
European Patent Office publications no. 0 159 345, 0 270 457, 0 360 423 B1.

DETAILED DESCRIPTION OF THE PREFERRED EMBODIMENTS

Figure 4A:
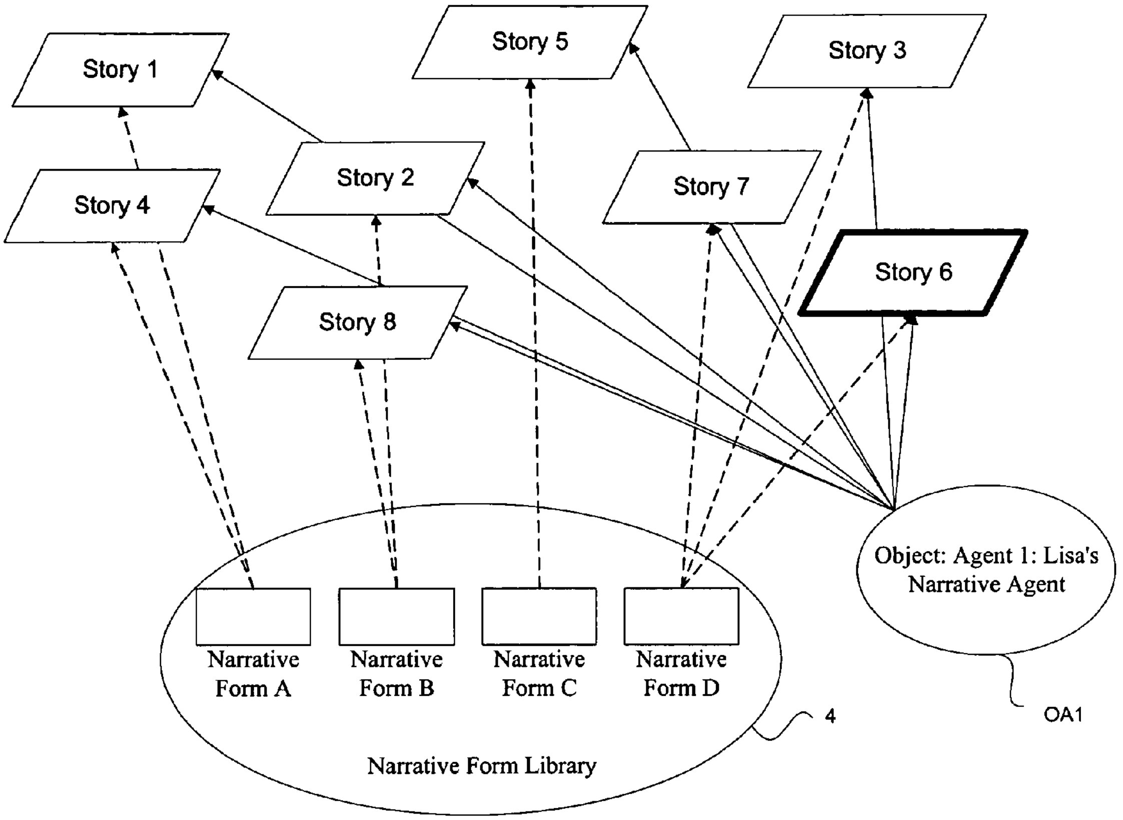
FIG. 4*a* schematically illustrates a user involved in multiple contemporaneous story experiences in accord with a preferred embodiment.

FIG. 4*a* schematically illustrates a user involved in multiple contemporaneous story experiences or stories in accord with a preferred embodiment. As set forth herein, a story shall include, but not be limited to, any event, expression, presentation or perception or sequence of events, expressions, presentations or perceptions, such as could be recounted by an observer thereof or participant therein. A story may involve tragedy, history, comedy, improvisation, drama, documentary, games, sports or the like.

FIG. 4*a* illustrates an object agent labeled object agent 1, which is Lisa's personal narrative agent OA1 or a personal narrative agent hereinafter "PNA") uniquely assigned to a user named Lisa, managing each of eight stories for Lisa labeled Story 1 through Story 8. Lisa's PNA OA1 is preferably generated within a computer system as instructed by system programming in accordance with input from Lisa and other system parameters. Each of Stories 1–8 is typically based on a narrative form from a narrative form library 4 available within a computer system memory and/or within its programming. For example, Stories 1 and 4 are each based on narrative form A, Stories 2 and 8 are each based on narrative form B, Story 5 is based on narrative form C and Stories 3 and 6–7 are each based on narrative form D. The narrative form library 4 may contain many more narrative forms than the four narrative forms A–D shown in FIG. 4*a*, and Lisa may be involved in any number of contemporaneous stories more or less than 8. Moreover, each of Stories 1–8 may be transformed into a new story based on a different narrative form, or may progress in its present narrative form, or may terminate or be abandoned prior to reaching a narrative conclusion, as set forth in more detail below with reference to FIG. 20.

The system according to FIG. 4*a* allows a user to be involved in more than one contemporaneous story experience or story that may be played out to a narrative conclusion. At any particular time, Lisa's PNA OA1 may manage multiple stories or stories for Lisa. Each story is an instantiation of a narrative form, e.g., as contained in the narrative form library 4, and a given narrative form may create multiple unique stories. Lisa's PNA OA1 determines which story sets the current scene for Lisa (e.g., which is the primary story), and manages transitions of the primary status among stories, as set forth in more detail below with reference to FIGS. 12–16. Lisa's PNA OA1 also may weave the various stories together in Lisa's experience. Since it drives the actions for each scene, Lisa's PNA OA1 can pull scene elements from other active stories, as well as from other sources. It is noted here that the same discussion above and below with respect to Lisa and Lisa's PNA OA1 relates also to the experiences of any other users and their uniquely assigned PNAs (not shown in FIG. 4*a*, but see, e.g., FIGS. 5–6).

As shown in the illustration of FIG. 4*a*, Lisa's PNA OA1 manages each of Stories 1–8, simultaneously. Lisa's PNA OA1 influences the progression of each story based on "belief" data including data relating to characters, objects and activities within the environment and Lisa's interests. The characters, objects and activities may combine computer- generated and/or user-generated inputs. Any single activity involving Lisa, such as an interaction with another character or other object in the environment, may serve to progress any number or none of the stories or stories. Lisa's PNA OA1 continuously updates the belief data including data relating to input from Lisa and interactions and activities of characters and objects in the environment. Lisa's PNA OA1 furthers the narrative progression of each story by generating and presenting interactive opportunities that Lisa may or may not choose to pursue. For example, Lisa's PNA OA1 manages transitions between stories seamlessly such that Lisa is never confined to pursuit of an isolated story experience.

Figure 4B:
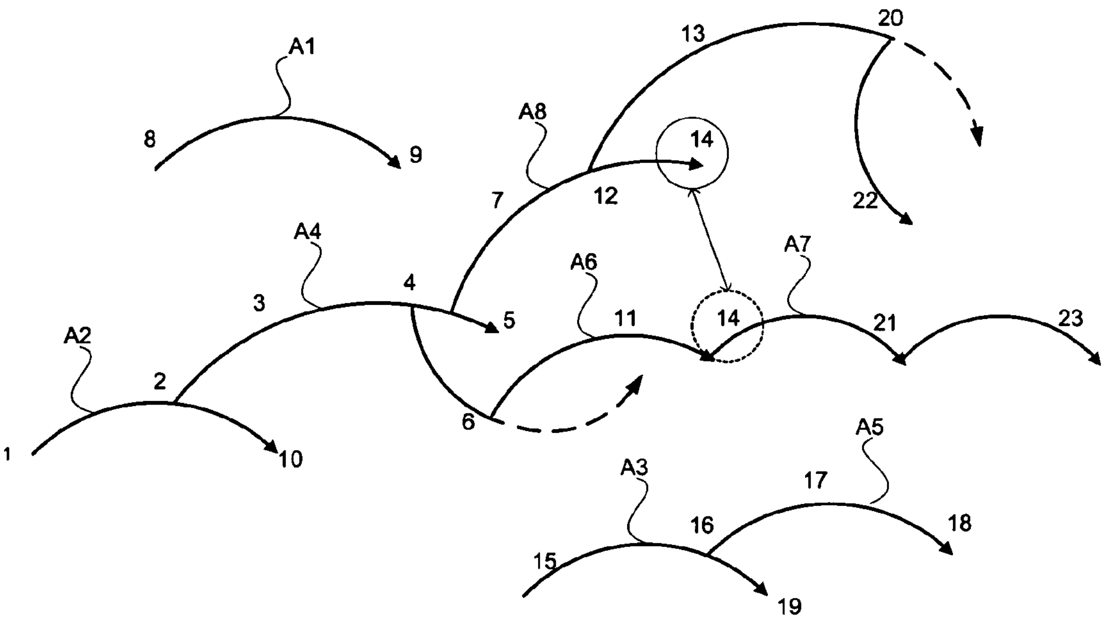
FIG. 4*b* illustrates multiple contemporaneous story experiences of a user in accord with a preferred embodiment FIG. 5 schematically illustrates multiple users each having a uniquely assigned PNA for creating and managing their story experiences in accord with a preferred embodiment.

Personal narrative software architecture in accord with preferred embodiments of the invention enables users to experience multiple stories simultaneously as referred to with respect to FIG. 4*a*. Each story could be finished at one continuous sitting, or could be experienced asynchronously. The diagram shown in FIG. 4*b* illustrates this feature by providing an example of a user's narrative experience. Each arc represents a specific story and the numbers 1–23 represent a time index. Some stories are completed and others can be abandoned as illustrated by dashed lines in FIG. 4*b*. Some stories have a genesis independent of other stories, e.g., stories A1, A2 and A3 beginning at time points 8, 1 and 15, respectively. Others can be derived from previous stories, e.g., story A4 from story A2 at time point 2 and story A5 from story A3 at time point 16.

FIG. 4*b* also shows how a single scene at a single point in time, e.g., time point 14, can contribute to more than one story, e.g., as represented by story arcs A6, A7 and A8. The PNA accomplishes this by weaving the stories together. Any scene might have elements and cause value transitions for two or more stories simultaneously and advantageously in accord with a preferred embodiment.

Figure 5:
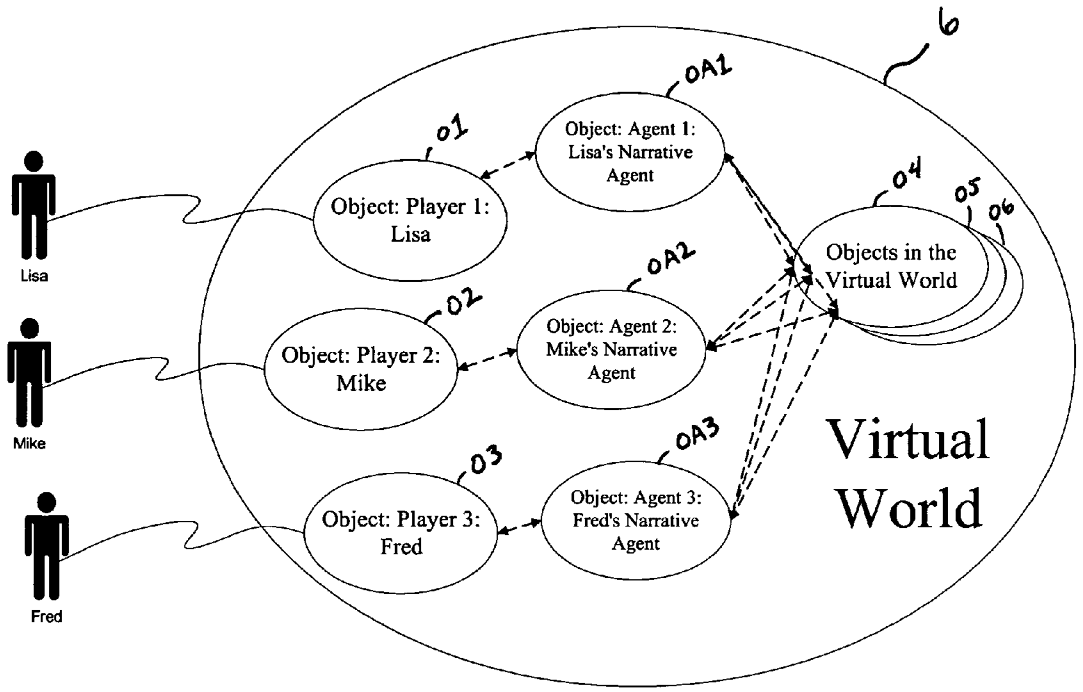

FIG. 5 schematically illustrates multiple users each having a uniquely assigned PNA for creating and managing story experiences in accord with a preferred embodiment. The example shown at FIG. 5 includes three users, Lisa, Mike and Fred each connected to a virtual world simulation 6 via the internet or a local or wide area network (LAN or WAN, see FIGS. 7*a*–7*b* and 9*a*–9*c*, and discussion thereof, below). The virtual world simulation represents a preferred story environment, whereas the story environment may be simulated or may alternatively be real. For example, the story environment may be a virtual world as generated by a computer-user interface, or may be a setting involving real persons as characters and real objects as objects, and the environment may be an open or restricted computer-generated simulation or, alternatively, a real space.

Each user receives his or her own uniquely assigned PNA. In accord with a preferred embodiment, the player's representation in the virtual world simulation 6 is instantiated as a player object, e.g., player objects O1, O2 and O3 represent Lisa, Mike and Fred, respectively. The player objects O1–O3 mediate communication and manage player state and game, tutorial, educational or event logic. The PNA of each player, e.g., agents OA1, OA2 and OA3 of Lisa, Mike and Fred, respectively, manipulate objects, e.g., objects O4, O5 and O6 shown in the virtual world 6 of FIG. 5, and presentations of those objects O4, O5, O6 to the user.

Thus, the system according to FIG. 5 allows multiple users each having a unique PNA working to progress one or more stories or stories involving that user, wherein each user may pursue individual interactive stories, whether or not the user chooses to involve any particular other user. The PNAs of each of the multiple users, e.g., Lisa, Mike and Fred interact with or influence objects in a common real or simulated environment, i.e., the virtual world simulation 6. The PNAs may also interact with each other to negotiate narrative progressions for their respective users that may involve other players. For example, Lisa may play a role in Mike's story and/or vice-versa, and the scene may be prearranged by negotiation between the PNAs of Lisa and Mike.

Figure 6A:
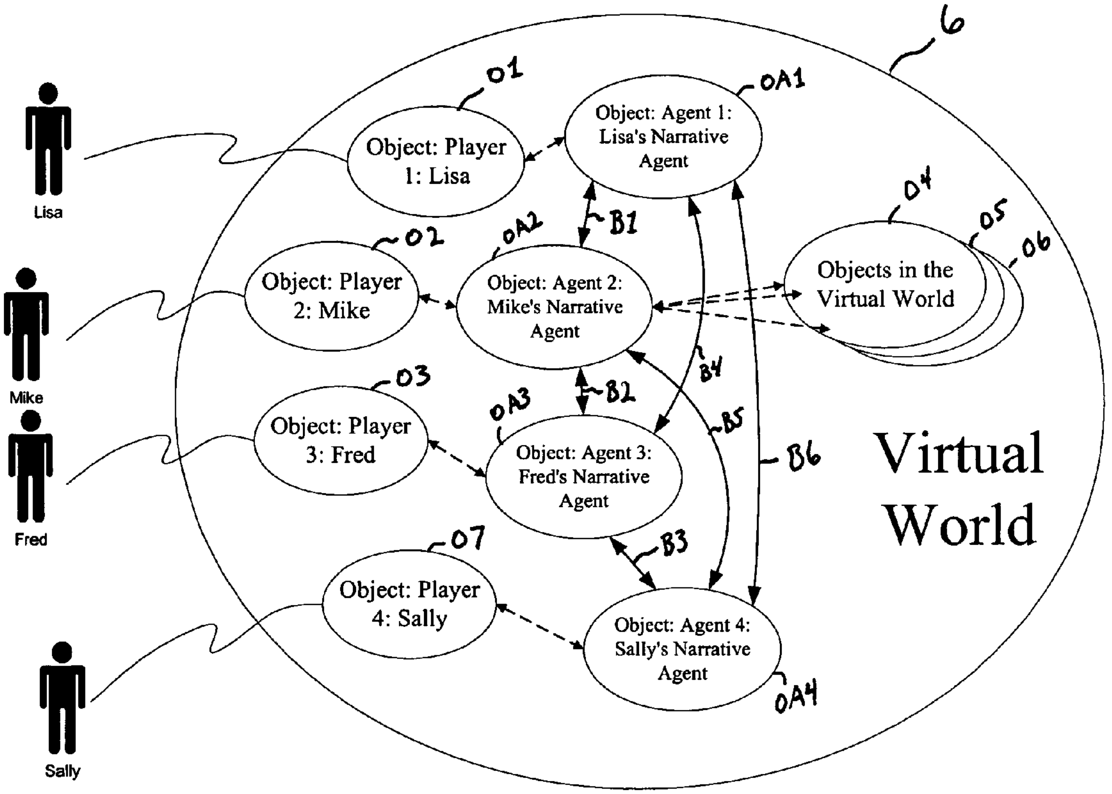
FIG. 6*a* schematically illustrates negotiation of a story experience by a PNA uniquely assigned to one user for its associated user with another PNA uniquely assigned to another user in accord with a preferred embodiment.

FIG. 6*a* illustrates negotiation of story experiences by PNAs uniquely assigned to users with other PNAs uniquely assigned to other users in accord with a preferred embodiment. FIG. 6*a* illustrates a virtual world simulation 6 with which four users, Lisa, Mike, Fred and Sally are connected over a network. The just-named users are represented in the virtual world 6 by user objects O1–O4, respectively, and each player has a uniquely assigned PNA represented by agent objects OA1–OA4, also respectively.

FIG. 6*a* illustrates PNAs interacting with each other to generate shared stories for their respective users. For example, Mike's PNA can request that Lisa, Sally and Fred be invited to participate in Mike's story, as illustrated by bi-directional arrows B1, B5 and B2. Fred's PNA might also request that Sally be invited to participate in the shared story, as illustrated by bi-directional arrow B3. Mike's PNA is also shown interacting with objects O4–O6 in the virtual world 6. The other PNAs also have the capacity to interact with objects O4–O6 as shown in FIG. 5, or to avoid such interaction if objects O4–O6 are not relevant to their players' stories, as shown in FIG. 6*b*.

The roles that the other users such as Lisa, Fred and Sally play in Mike's story can be small parts limited to one or a few scenes, or these other users can share entire stories designed for two or more users. At an extreme, the PNA of one user may negotiate with thousands of other PNAs to bring the user into a wide-ranging story. For example, the PNA of a general in a story might recruit two entire armies made up of users and their uniquely assigned PNAs, and characters and objects in the virtual world. Such widespread negotiations may also utilize distributed, hierarchical networks of PNAs, such that each PNA negotiates with a limited number of other PNAs. Continuing the above example, the PNA of the general may negotiate with PNAs of staff officers which negotiate with PNAs of lower ranking officers, which negotiate with PNAs of staff sergeants, which negotiate with PNAs of lower ranking enlisted personnel, etc. In this way, enlisted personnel characters may participate in the story of a user playing a general, such as in a game or educational scenario, and may be subject to the broad orders of the general, while their associated PNAs never negotiate directly with the general's PNA, simulating a military hierarchy of command.

Figure 6B:
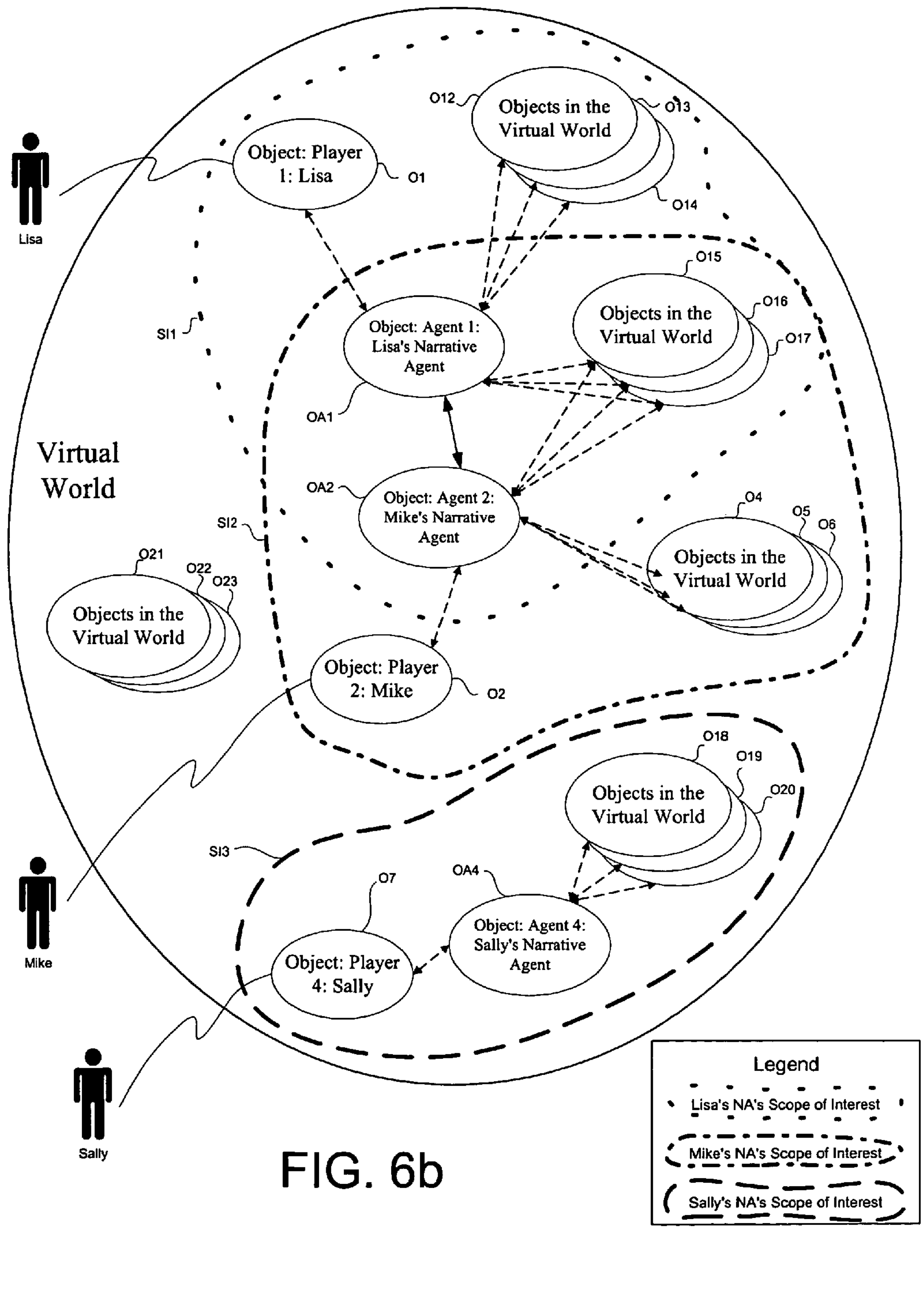
FIG. 6*b* schematically illustrates narrative agent scopes of interest in accord with a preferred embodiment.

FIG. 6*b* schematically illustrates the scopes of interest of PNAs. Each PNA can limit its awareness of the objects in the environment to those objects that are relevant to its user's stories. For example, Lisa's PNA OA1 maintains awareness and a scope of interest SI1 that includes O1, O12–O17, and OA2, and can choose to interact with any of those objects to further Lisa's story or stories. As objects become relevant to Lisa's stories, SI1 expands to include those objects, and objects that are no longer important to Lisa's stories are removed from SI1.

Similarly, Mike's PNA OA2 has a scope of interest SI2 that includes O2, O4–O6, O15–O17, and OA1, and thus partially overlaps with SI1. Lisa's and Mike's narrative agents OA1 and OA2 can negotiate with one another for story opportunities for their respective users, as illustrated by B1. Similarly, the PNAs OA1 and OA2 share an interest in objects O15–O17 and can negotiate for their use Lisa's and Mike's stories, as illustrated by connections B7 and B8 to object O15. A PNA's scope of interest need not overlap with other PNAs', as illustrated by Sally's PNA's scope of interest S13. In accord with a preferred embodiment, many objects in the world might not be in any PNA's scope of interest, as illustrated by O21–O23.

Figure 7A:
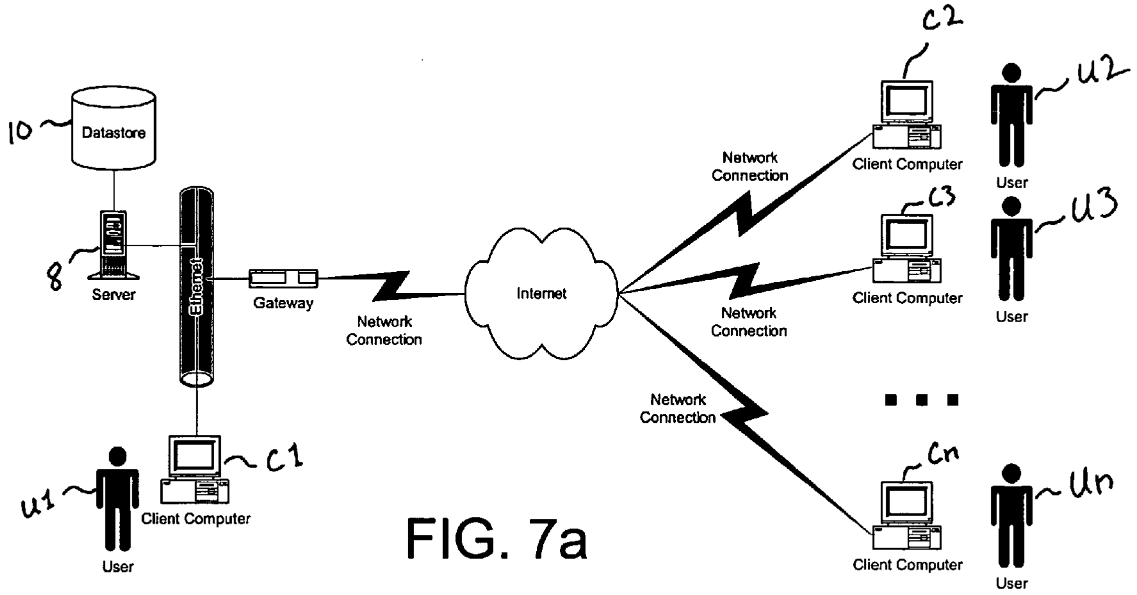
FIG. 7*a* schematically illustrates a network diagram in accord with a preferred embodiment.
Figure 7B:
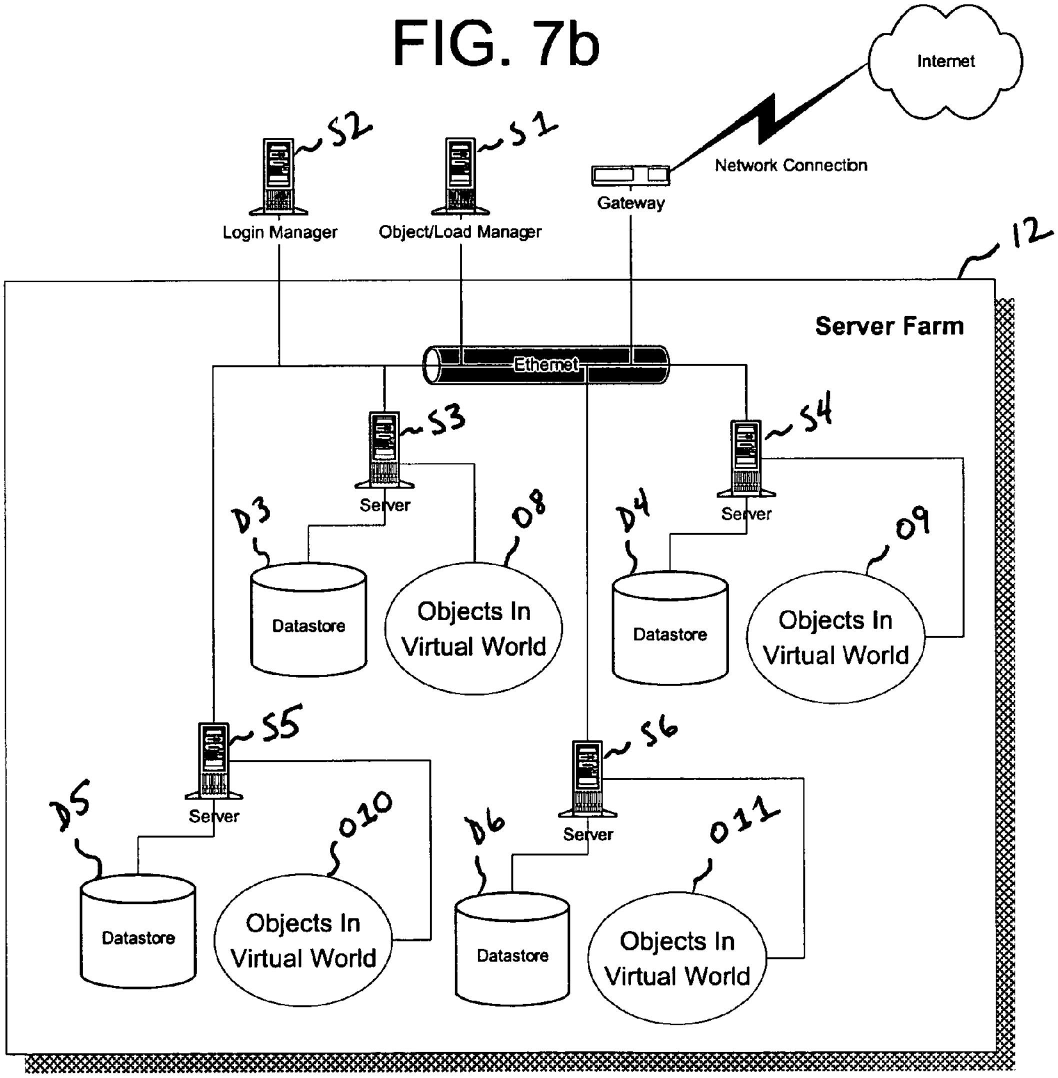
FIG. 7*b* schematically illustrates a network diagram including a server farm in accord with a preferred embodiment.

FIGS. 7*a* and 7*b* schematically illustrate network diagrams in accord with preferred embodiments. Referring to FIG. 7*a*, a host server 8 or server complex has access to a datastore 10 containing information such as may relate to current states of objects in the virtual world for allowing one or more users to participate in interactive narratives according to the preferred embodiments. The server 8 or server complex manages user connections, and receives and passes along data relevant to a user's dramatic stories. Such data may include movements and actions of users, nearby users, automated objects controlled by the server 8, audio video or data files, and other such related data. In addition, the server or server complex manages authentication, security, and integrity for each player connection. Administrative users can also connect to the server 8.

A first user U1 is shown connected to the server 8 in the exemplary network diagram of FIG. 7*a*, in accord with a preferred embodiment. A connection is made to the internet. Several other users may be connected to the server via the internet, in this example, such as users U2, U3 . . . Un using client computers C2, C3 . . . Cn having network connection hardware and software. In alternative embodiments, users may connect to the servers with many types of client devices, including for example cell phones, personal digital assistants, video game consoles or devices, cable set-top boxes, interactive televisions, or other dedicated or general-purpose computing devices or platforms.

Referring now to FIG. 7*b*, a server complex such as was referred to with respect to FIG. 7*a* is schematically shown. The system shown is connected to the internet. An object/load manager server S1 is also shown connected to the network. The object/load manager server S1 preferably performs the function of managing user connections and receiving and distributing data relevant to user's dramatic stories, such as data relating to user movements and actions, nearby users, automated objects controlled by the object/load manager server or another server, audio, video and/or data files, or other such related data. A login manager server S2 is also shown connected to the network. The login manager server S2 preferably performs the function of managing authentication, security and integrity for each user connection.

A server farm 12 is also shown including multiple additional servers S3–S6. Many more than four such servers may be included in the server farm 12 which could be a vast network connecting users on a very large scale, or could be limited to a single server or a few servers and a localized or wide area network. Each server S3–S6 in the server farm 12 is shown connected to a datastore D3–D6, respectively, which contain information such as relates to current states of objects O8–O11, respectively, for allowing one or more users to interact within an environment, such as a virtual world, according to the preferred embodiments. Each server S3–S6 preferably manages objects in the virtual world O8–O11, respectively, within which users connected thereto are interacting and experiencing interactive stories.

Figure 8:
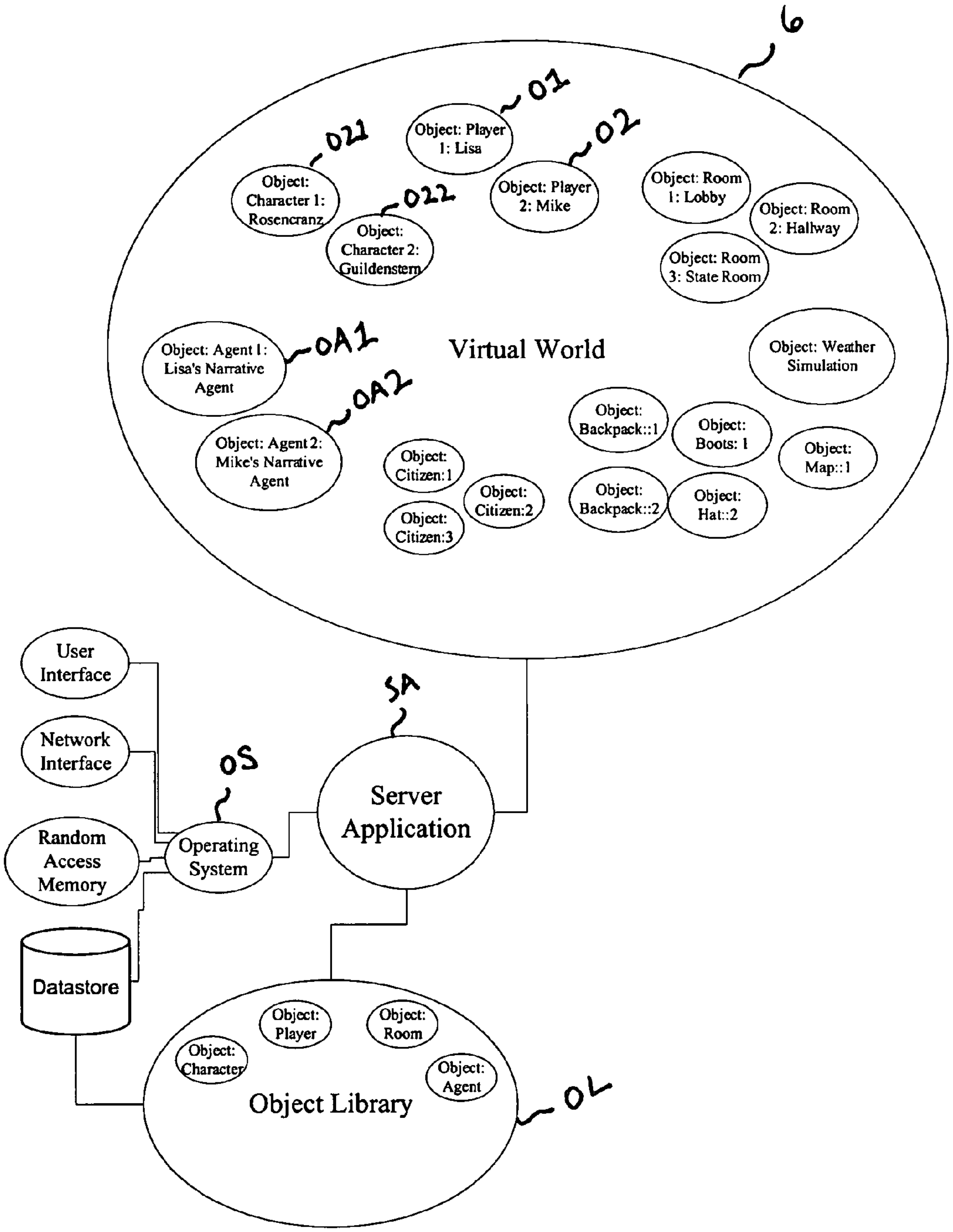
FIG. 8 schematically illustrates server management of a virtual world in accord with a preferred embodiment.

FIG. 8 schematically illustrates server management of a virtual world in greater detail in accord with a preferred embodiment. An operating system OS runs underneath a personal narrative server application SA. The server application manages the state of a virtual reality simulation 6, including the states and communications of users, automated characters, subsystems, locations and other objects in the simulation 6.

The virtual world 6 of FIG. 8, which the server application SA manages, includes Lisa's narrative agent OA1 and Mike's narrative agent OA2 and player objects for Lisa and Mike, O1 and O2 respectively. Object characters Rosencranz and Guildenstern are computer-controlled characters also immersed in the virtual world 6. These characters might or might not be utilized as object characters in a story of Lisa and/or Mike, perhaps upon negotiation between the the computer-controlled characters and the narrative agents of Lisa and Mike. Many more objects are shown in the virtual world 6 including three citizen objects, a weather simulation object, lobby, hallway and state room objects, and two backpack, boots, map and hat objects, each of which is managed by the server application SA in accordance with input from Mike and Lisa via their player objects O1, O2 and Mike and Lisa's narrative agents OA1, OA2, and the stories and narrative forms currently taking place in the virtual world 6.

In this regard, each of the player objects O1 and O2 respectively associated with Lisa and Mike may have associated PNAs, or either or both of objects O1 or O2 may not have PNAs associated with them. That is, Lisa and/or Mike may alternatively choose to be involved in the virtual world 6 without a PNA as described herein. In addition, each of the computer-controlled character objects O21 and O22 respectively associated with Rosencranz and Guildenstern may or may not have PNAs associated with them. A PNA associated with either of Rosencranz or Guildenstern may function just as a PNA associated with a user such as Lisa or Mike, except that computer input is substituted for user input. In addition, either of the computer-controlled characters of Rosencranz or Guildenstern may have been previously user-controlled, and the user- control reverted to computer-control, e.g., when the user associated with either Rosencranz or Guildenstern logged off. Any involv ment of the Rosencranz or Guildenstern characters in any ongoing stories is thus advantageously continued under computer control. Moreover, either of the computer-controlled characters of Rosencranz or Guildenstern may revert to user-control, wherein the user would replace the computer in controlling the stories involving either of the Rosencranz or Guildenstern. Thus, a user may become involved in one or more stories that has already progressed, and need not begin story involvement at the beginning when logging on or otherwise jumping into the virtual world or other story environment.

The server application SA instantiates objects from its object library OL. In the example of FIG. 8, character, player or user, room and agent objects are stored in the object library OL or the server application SA. The server application SA also saves the current state of any object (including those of users or players and automated characters) into a datastore when necessary or appropriate. A user interface, network interface and random access memory are also shown in FIG. 8.

Figure 9A:
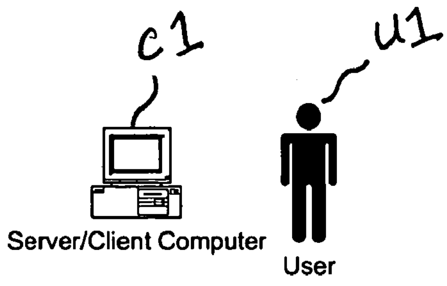
Figure 9B:
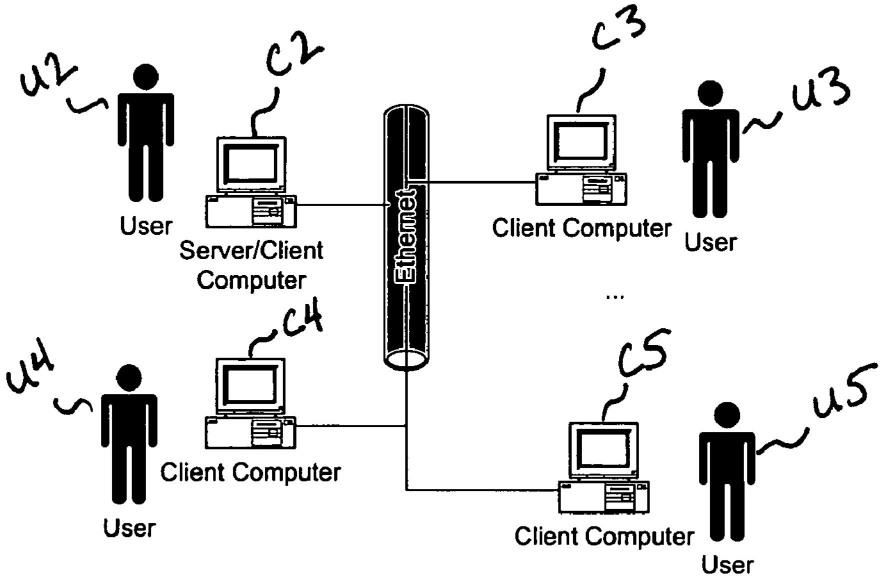

FIGS. 9*a*–9*c* illustrate single computer, LAN, WAN and large-scale network or internet use of the personal narrative of the preferred embodiment among many advantageous uses. As mentioned above in the discussion of FIG. 7*a*, alternative embodiments exist in which many other types of devices are used instead of the "Computer" as shown in FIGS. 9*a*–9*c*. In the single user embodiment shown at FIG. 9*a*, personal narrative software runs on a single computer C1 which is accessed directly by a single user U1. The single computer C1 in this case acts as both server and client.

Referring to FIG. 9*b*, a LAN-based multiple user network environment is shown for use of the personal narrative of the preferred embodiment. Multiple users U2–U5 having access to client computers C2- C5, respectively, are each logged onto the LAN via ethernet. In the LAN- based multi-user embodiment of FIG. 9*b*, one of the client computers, e.g., C2, functions as a personal narrative server such as may be running the server application SA described above with respect to FIG. 8, and the other client computers C3–C5 connect to the client-server computer C2 in order to experience personal narrative according to the preferred embodiment. There might also be a separate server computer on the LAN that is not used by a user as a client device.

An example of WAN or large-scale network or internet-based use of the personal narrative of a preferred embodiment is illustrated at FIG. 9*c*, which is excerpted from U.S. Pat. No. 5,897,622 as a general network structural example. A client computer 100 is shown connected to a server complex 102 including a gateway server 101, via connection over a network 104, which may be the internet or other large scale network. Other connections such as an IR link 107 and a satellite link 109 are shown.

The gateway server 102 is shown connected to a wide area network (WAN) 106 including a number of network servers S7–S10. As shown the network servers S7–S10 may be situated large distances from each other, such as in Los Angeles, San Diego, San Francisco and Las Vegas. Many client computers, e.g., such as client computers C2–C7 of FIG. 9*c*, may be connected to the WAN 106 through the network servers S7–S10. A local area network (LAN) 108 made up of client computers C2–C5 is shown connected to the WAN 106 through a connection to network server S8, wherein additional client computers C6–C7 are connected into the LAN 108 at client computer C4.

Figure 10:
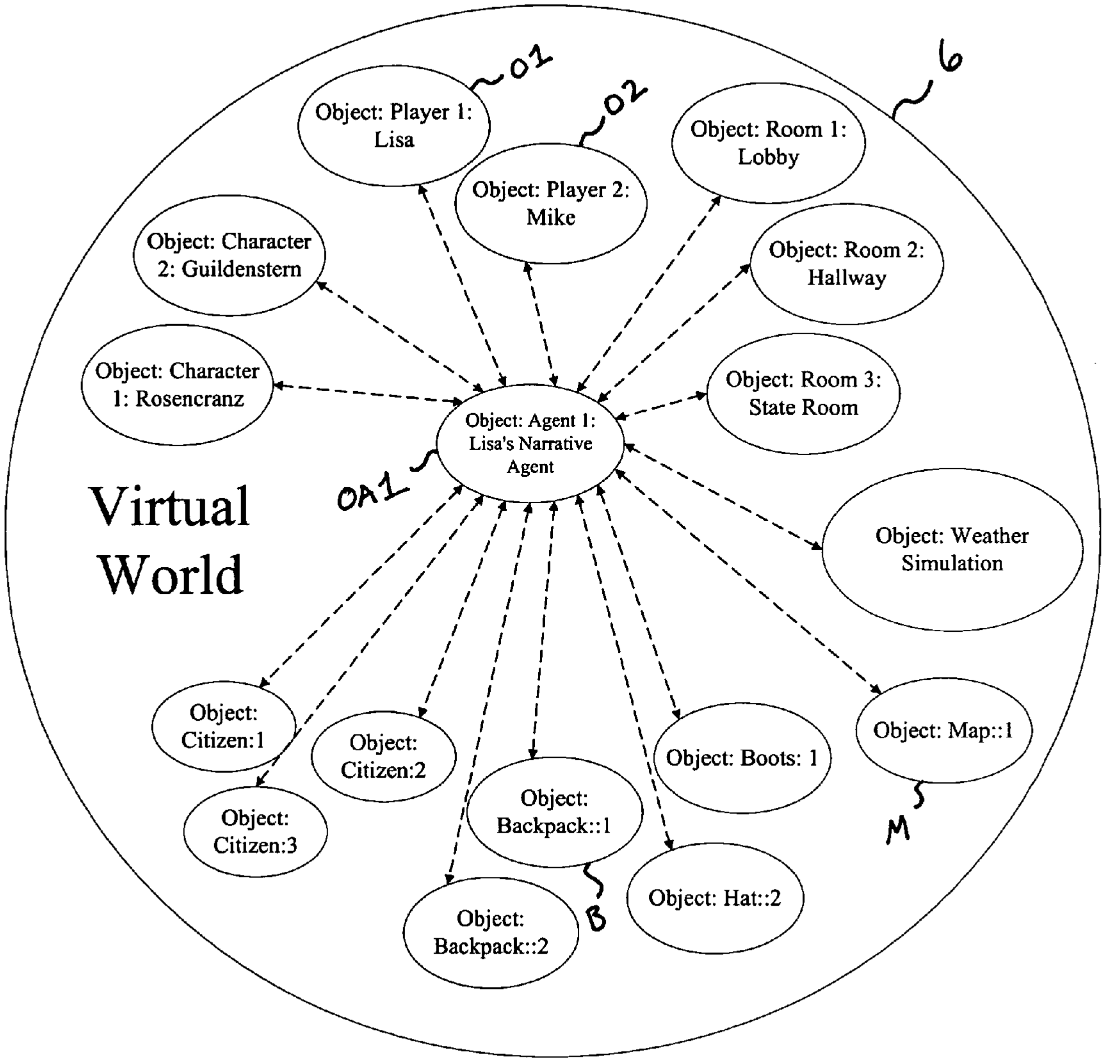
FIG. 10 illustrates narrative agent querying and modification of world state in accord with a preferred embodiment.

A more detailed description of the form and function of a personal narrative agent in accord with the preferred embodiments is now set forth in the discussions that follow with references to the drawings. Referring first to FIG. 10, Lisa's PNA OA1, from the above example, is shown immersed within the virtual world 6, wherein Lisa's PNA interacts with objects and influences actions and movements of objects in the interests of Lisa's narrative experiences. FIG. 10 illustrates querying and modification of world state by Lisa's PNA OA1 in accord with a preferred embodiment. Although not shown, many additional PNAs including, e.g., Mike's PNA OA2 from the above example, are also preferably interacting with and influencing object actions and movements in the simulated world 6.

The bidirectional arrows pointing to and from objects in the virtual world 6 and to and from Lisa's PNA OA1 indicate the role of Lisa's PNA OA1. Lisa's PNA OA1 can access detailed knowledge about the portion of the virtual world simulation 6 that is relevant to Lisa. As illustrated in FIG. 10, Lisa's PNA OA1 maintains a data about the environment including information relating to each of the player or user objects O1, O2, and citizen, character, room, weather and other objects in the virtual world 6 that may be relevant to one of more of Lisa's story experiences or stories. Lisa's PNA OA1 can cause events in the world in order to create new opportunities to advance Lisa's current stories or to follow new stories. For example, Lisa's PNA OA1 may query an object such as a map object M to determine whether the map may be used to advance a story involving Lisa, and if so, might cause the map to be blown along the ground across the path of Lisa's player object O1 to turn Lisa's attention to the map, or an item may fall out of a backpack object B, etc.

Figure 11:
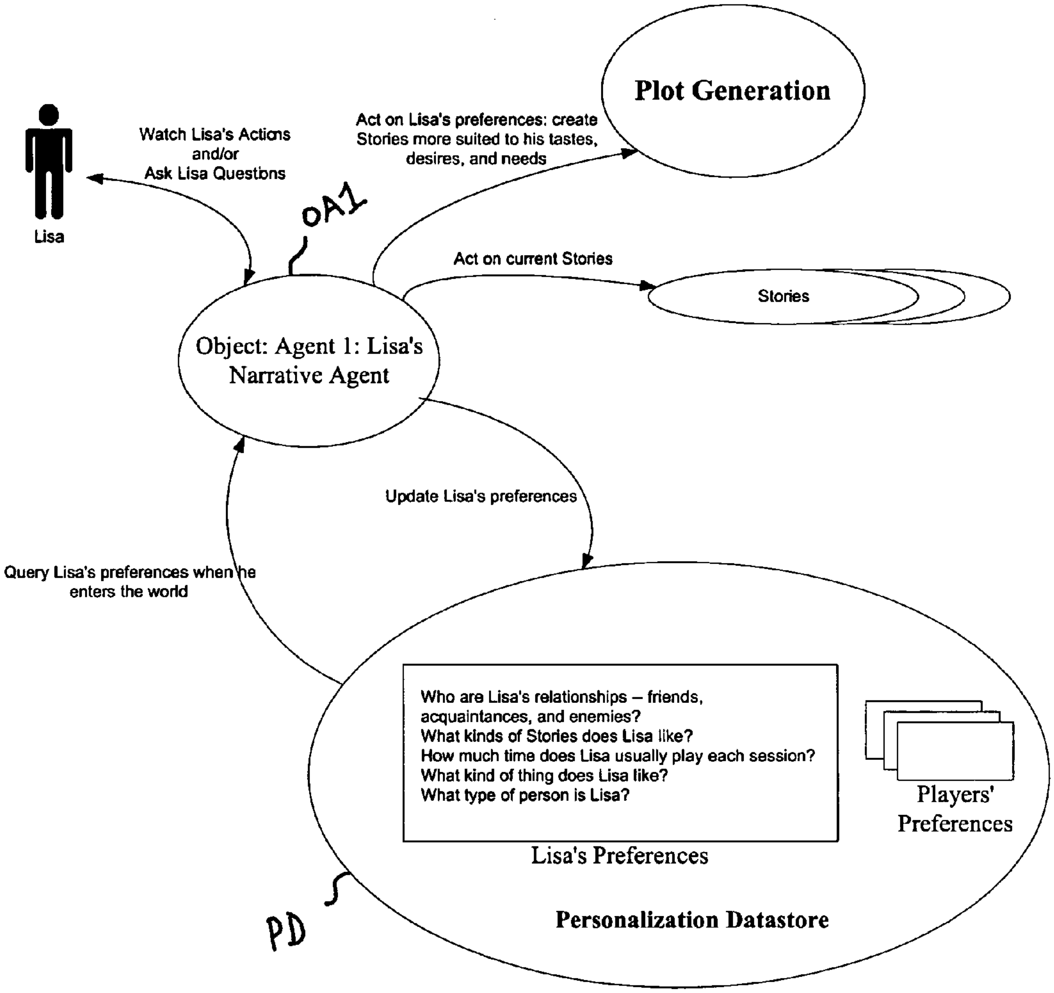
FIG. 11 illustrates narrative personalization for each user in accord with a preferred embodiment.

Referring to FIG. 11, narrative personalization for a user, e.g., Lisa, by a personal narrative agent, e.g., Lisa's PNA OA1, is illustrated. In accord with a preferred embodiment, Lisa's PNA OA1 maintains a detailed set of data regarding Lisa's interests, preferences and past actions, and uses that information in order to enhance the story experiences offered to Lisa. Similarly, other PNA's of other users maintain similar data with respect to those other users in a preferred embodiment. Alternative embodiments exist where no such information is gathered or maintained.

As shown in FIG. 11, Lisa's PNA OA1 watches Lisa's actions and/or asks Lisa questions to increase and/or update its information base with respect to Lisa. The information maintained by Lisa's PNA OA1 may be regarded as part of the relevant data maintained by Lisa's PNA OA1. The information may be stored in a personalization datastore PD as shown. The personalization datastore might contain such information relating to: Lisa's relationships with other player or character objects in the virtual world 6, e.g., with friends, acquaintances and enemies; the kinds of stories Lisa is interested or not interested in; how much time Lisa typically spends during each online session; the kinds of non-persona objects Lisa is interested or not interested in; the kind of person Lisa is; and any other information relevant to Lisa's experience with respect to her story or stories. Lisa's PNA OA1 queries Lisa's preferences when Lisa enters the environment (such as a virtual world 6) and updates Lisa's preferences based on such things as Lisa's actions and answers provided by Lisa in response to questions posed to Lisa.

Lisa's PNA OA1 utilizes information in the personalization datastore PD to act on current stories. Lisa's PNA OA1 may act on Lisa's preferences to create and/or manage stories suited to Lisa's tastes, desires and needs.

Referring back to FIG. 4 in this context, at any particular time, Lisa's PNA OA1 manages many possible stories for Lisa. Each story is an instantiation of a narrative form, wherein each narrative form may create multiple unique stories. Lisa's PNA OA1 determines which story sets a current "scene" (see below discussion beginning with reference to FIG. 12) for Lisa, e.g., which story is the primary story, and manages transitions of the primary status among stories. Lisa's PNA OA1 also weaves various different stories together in Lisa's experience. Since the PNA OA1 drives the event possibilities for each scene, the PNA OA1 can pull scene elements from other active stories, as well as from other sources.

Figure 12:
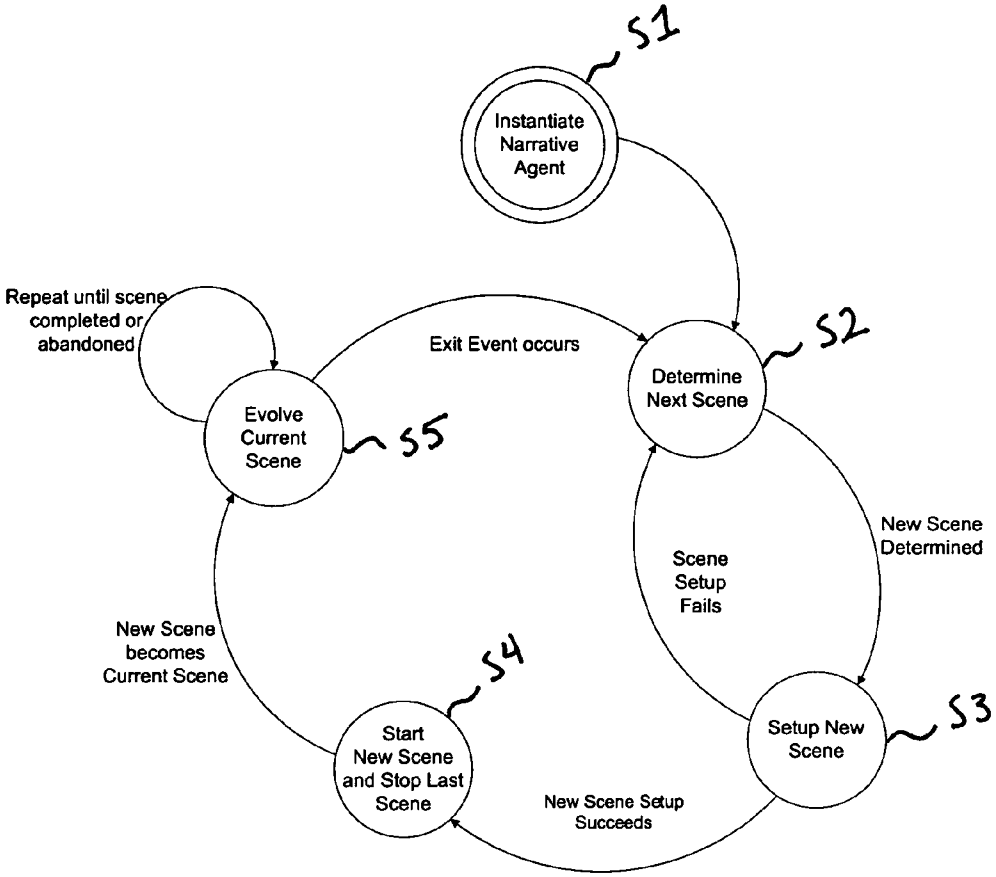
FIG. 12 illustrates management of scenes and a narrative agent state machine in accord with a preferred embodiment.

FIG. 12 illustrates management of scenes and a narrative agent state machine in accord with a preferred embodiment. The uniquely assigned PNA of each player or user, such as Lisa's PNA OA1 or Mike's PNA OA2 as in the above example, manages the creation and progression of scenes for its player or user. According to the example shown in FIG. 12, scene creation and progression begins with instantiation of a PNA at step S1, which next sets about to determine the next scene for its user at step S2. Once the new scene is determined, then the new scene is setup at step S3. If the new scene setup fails, then the PNA goes about determining and setting up a next scene again by returning to step S2. If the new scene setup succeeds, then the new scene is started and a previous scene is stopped at step S4. Now that the new scene is the current scene, the scene is evolved at step S5, typically repeatedly, until either completed or abandoned, or until the user branches to a different story at which time a new primary story would be set and the primary story status updated by the PNA (see discussion below with respect to FIG. 13). An exit event then occurs and a next scene is again determined as the method returns again to step S2.

Figure 13:
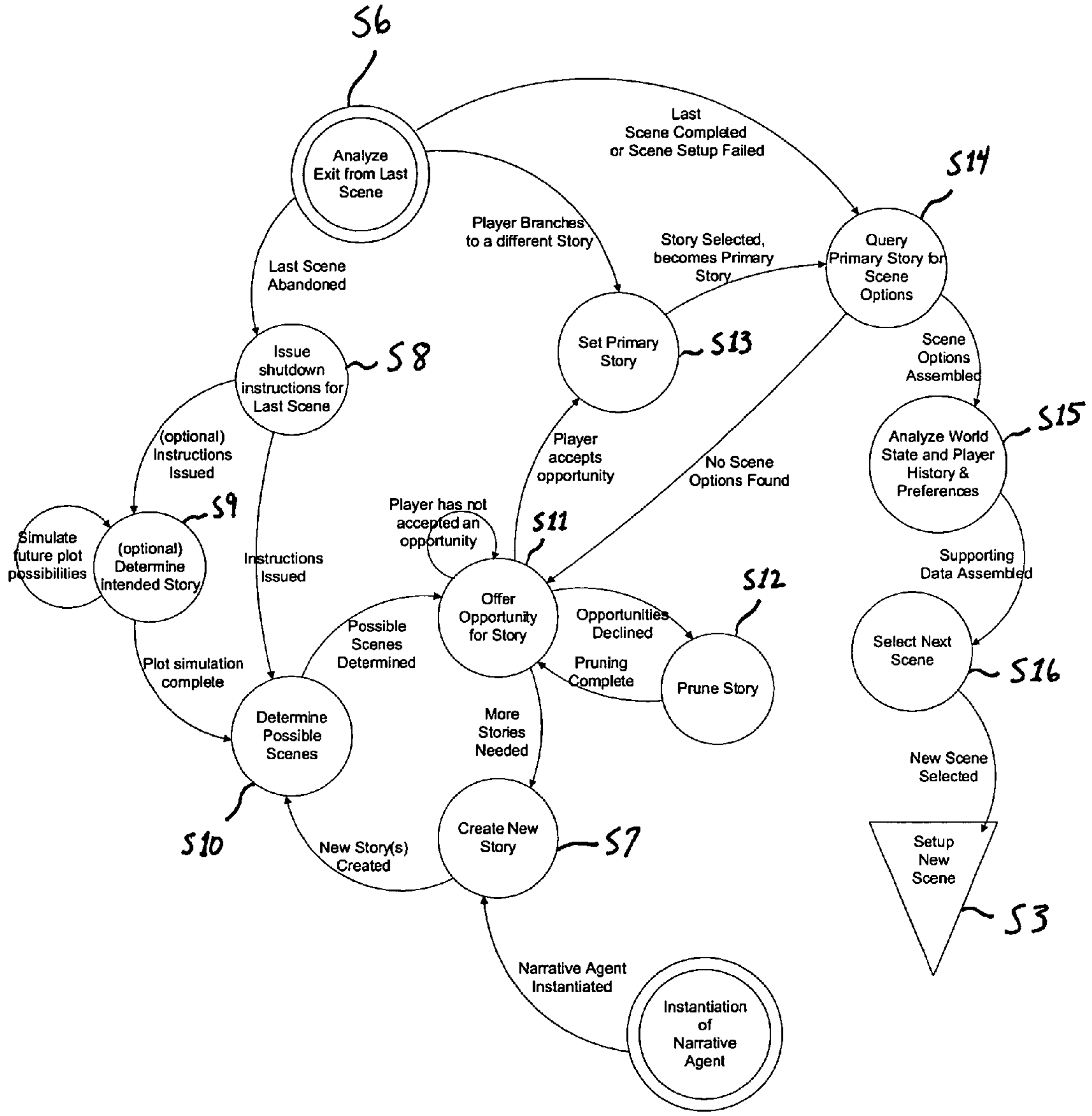
FIG. 13 illustrates narrative agent determination of a successive scene in accord with a preferred embodiment.

Referring now to FIG. 13, upon exiting from a previous scene, the user's uniquely assigned PNA sets forth to first analyze an event that caused the exit from the last scene at step S6 in a method for determining a next scene. A second entry point is shown in FIG. 13 corresponding to initial instantiation of the PNA as shown at step S1 of FIG. 12. In either case, the PNA sets forth to determine the next scene, such as at step S2 of FIG. 12, and as set forth in detail in FIG. 13.

In the case of initial instantiation at step S1, no previous scene exists, so the PNA starts from scratch by creating a new story at step S7. A detailed process for creating a new story is set forth at FIG. 17, discussed below. Once the new story is created at step S7, then possible scenes are determined at step S10.

In the case where a previous scene does exist, three possible courses of action exist, as shown, for the PNA in FIG. 13. A first course of action is taken when the user to which the PNA is uniquely assigned abandoned the last scene. In this first case, the PNA issues shutdown instructions for the previous scene at step S8. After issuance of the instructions, either an intended story is determined at step S9, wherein future plot possibilities are simulated, after which at step S10 possible scenes are determined, or the method goes directly to step S10 for determining possible scenes. Whether step S10 has been reached after initial instantiation at step S1, or after a last scene was abandoned and analyzed beginning at step S6, one or more opportunities for story are offered to the user at step S11. For each story opportunity offered to the user at step S11, the user may accept or decline the opportunity. If a storyopportunities to enter a story are declined, then the story may be pruned (deleted from the pool of the user's active stories) at step S12. Story opportunities are offered to the user while the user has still not accepted an opportunity at step S11. If no further story opportunities are available, then the PNA may return to step S7 to create new stories and step S10 to determine possible scenes for the stories before returning again to step S11 to offer the stories as opportunities to the user. Once the user accepts a story opportunity, the primary story is set at step S13.

A second course of action may be taken when a previous scene exists and the user has branched to a different story. If the user branched away from the last scene at an opportunity for such a story transition placed there by the user's uniquely assigned PNA, then the story followed by the user will now become the primary story. Referring to FIG. 13, this exit or branching to a new story is analyzed at step S6 and the primary story is set at step S13 as the story to which the user chose to branch.

A third course of action may be taken when a previous scene exists and that scene has been completed, or when the setup of the previous scene failed. The primary story in this case is maintained, and the next scene will come from its set of possibilities.

Whether a primary story has been set at step S13 by a user choosing to branch to that story from a previous story, or by a user choosing an offered story opportunity at step S11, or because the previous scene has been completed, the next step shown in FIG. 13 for the PNA is to query the primary story for scene options at step S14. If no options are found, the PNA returns to step S11 to offer further story opportunities. Otherwise, scene options are assembled and the PNA analyzes the world state and player or user history and preferences at step S15. Supporting data such as was described above with reference to FIG. 11 is assembled and a next scene is selected at step S16. Once the next scene is selected, then the next scene is setup at step S3, as shown at FIG. 13 and the method continues with step S17 of FIG. 12 and the starting of the new scene.

Figure 14:
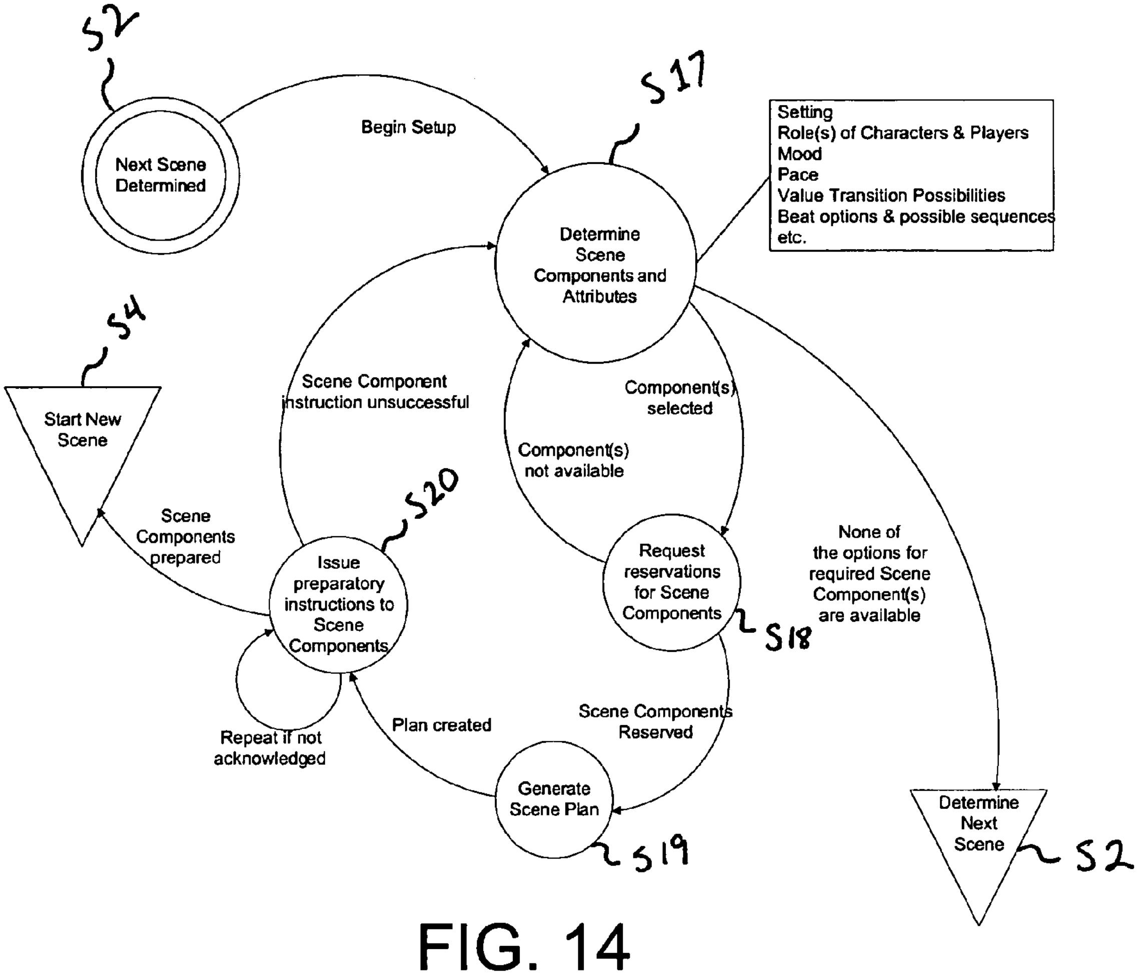
FIG. 14 illustrates narrative agent setup of a successive scene in accord with a preferred embodiment.

Referring now to FIG. 14, a method for a PNA to set up a new scene in accord with a preferred embodiment is illustrated and described. Once the new scene is selected at step S16 (which is included within Next Scene Determined S2 in FIG. 14), setup is begun at step S17 by the PNA determining scene components and attributes. To setup a new scene, the PNA chooses specific people or objects to play the roles required or desired in the scene, plans the action and issues instructions to scene components. Some of these scene components and attributes may include the setting, roles of characters, citizens, objects and/or players or users, the mood, the pace, value transition possibilities, beat options and possible sequences (see FIGS. 16 and 18–19 and discussion thereof below relating to beats).

Each component is represented by an object in the environment, which might be a virtual world 6. The needs or desired options for a specific scene are included in its grammar, as specified by its narrative form. Available data sources for possible scene components include active stories, the virtual world 6, other PNAs, history and preference of the user to which the PNA is uniquely assigned, and the object library OL. If none of the options for required scene components are available, then another scene is selected in step S2 as mentioned above in discussion of FIG. 13.

However, if at least one option for each of the required scene components is available, then after these required and perhaps other optional scene components are selected, then a reservation request for the selected scene components is made by the PNA at step S18. If any one of the selected components is unavailable, then the method returns to step S17 such that other scene components and attributes may be determined. Once selected scene components are reserved, then a scene plan is generated at step S19. The plan for the scene includes the series of steps the PNA will carry out to move the scene forward, including the timing of the beats in the scene (see below) and the possible events that could occur in each beat. The PNA will adapt this plan to changing conditions and player actions throughout the evolution of the scene.

Once the scene plan is created at step S19, preparatory instructions are issued to scene components at step S20. Instructions to the scene components include the location of the scene, actions and goals for the possible beats of the scene, and actions and goals for the shutdown of the scene. These instructions are preferably issued repeatedly until acknowledged at step S20, or if scene component instruction is unsuccessful, then the method returns to step S17. Once the scene components are prepared, then the new scene is started at step S4, as in shown in FIGS. 12 and 15.

Figure 15:
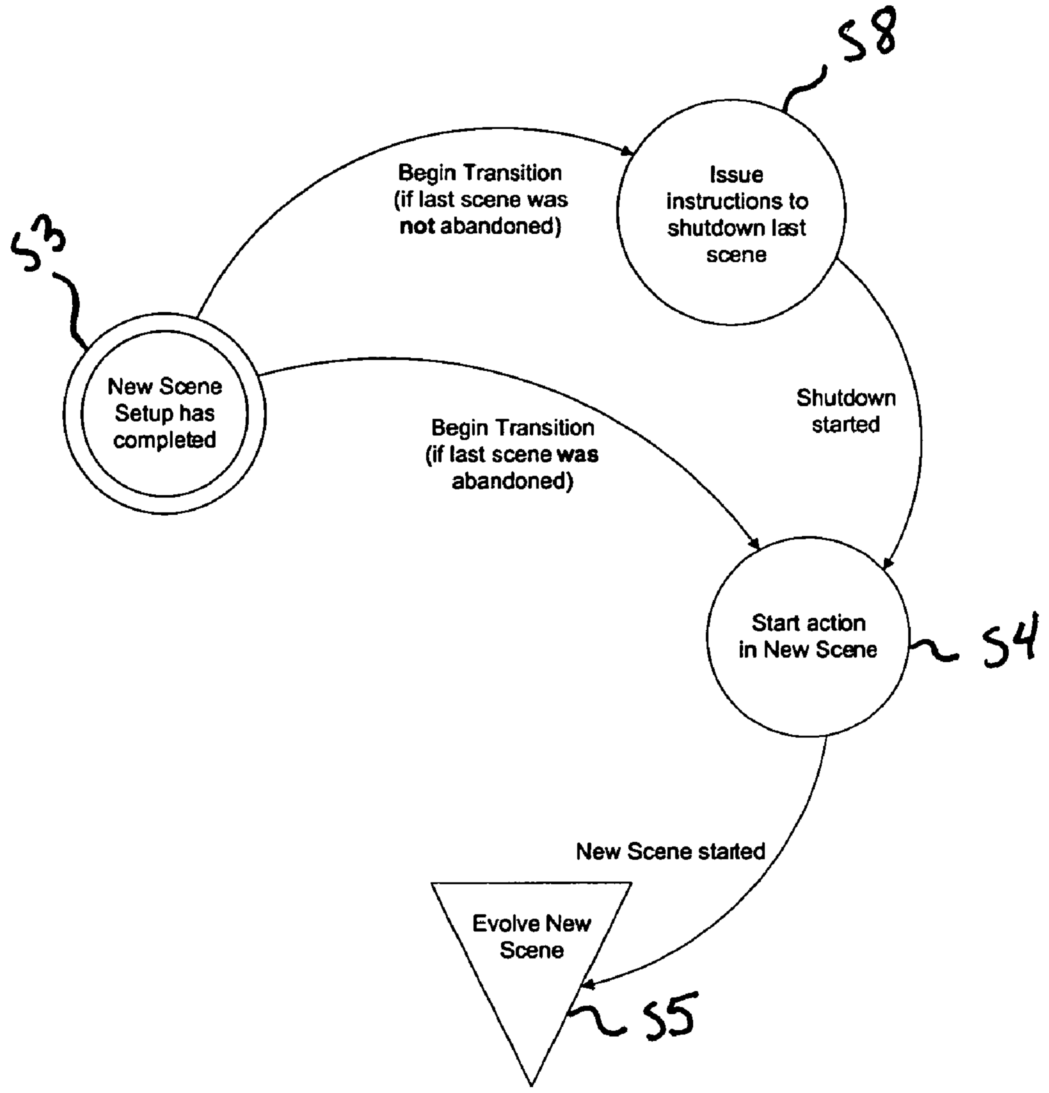
FIG. 15 illustrates narrative agent transition between successive scenes in accord with a preferred embodiment.

Referring now to FIG. 15, once a new scene setup has been completed at step S3, the transition between the last scene and the new scene should occur smoothly. If the last scene was not abandoned and the last scene is still running at this point, the components of the last scene are given any final instructions and then released. The instructions to shutdown the last scene are issued by the PNA at step S8. Since the new scene is now known and ready, the instructions to last scene's components allow a smooth transition into the new scene. Once the instructions to shutdown are issued at step S8, or if the last scene was abandoned in which case it has already been shut down, then the PNA starts the action in the new scene at step S4 of FIG. 15. The new scene is then evolved at step S5.

Figure 16:
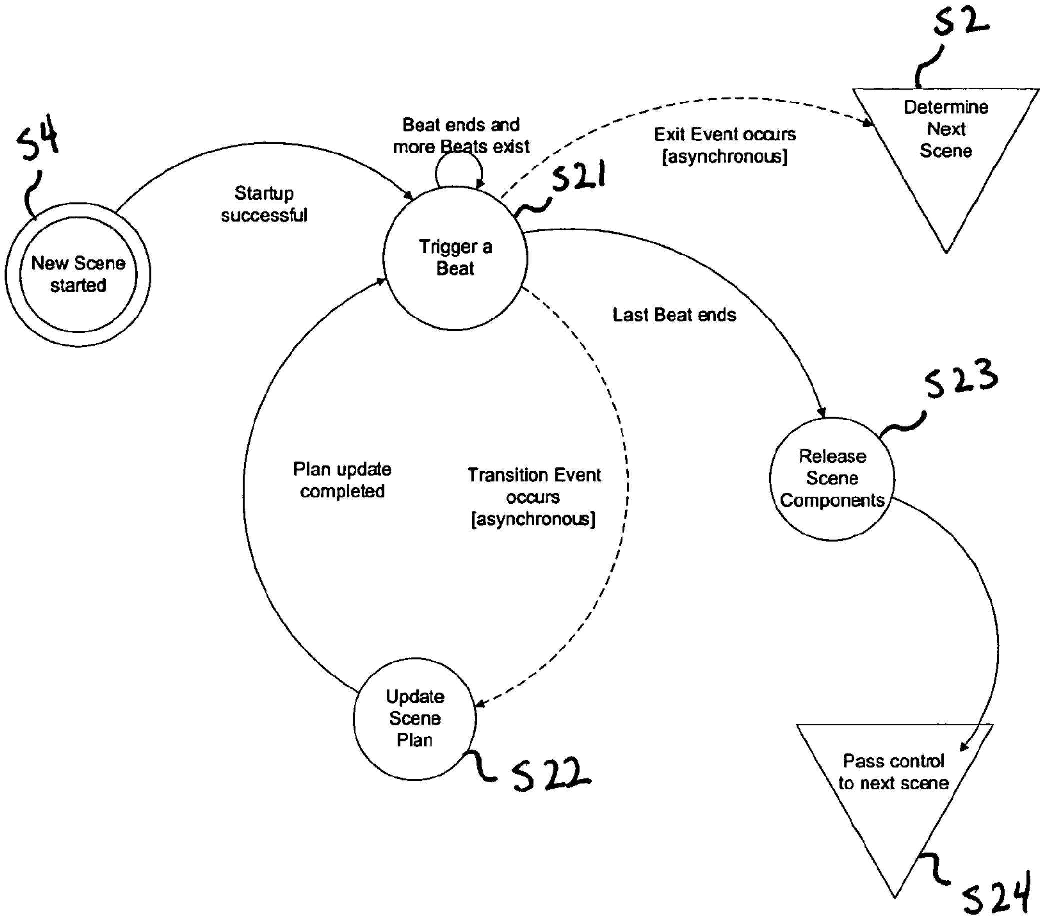
FIG. 16 illustrates narrative agent evolution of a current scene in accord with a preferred embodiment.

Referring to FIG. 16, once a new scene is started at step S4, the PNA triggers beats, or action/response sets, to move the scene forward at step S21. During each beat, some set of the scene components and players act and react to one another. These actions and reactions may trigger transition events which update the scene plan at step S22 when they occur. A transition event is some event or action that causes the PNA to update its plan for the scene in order to continue. After the scene plan is updated, a new beat is triggered at step S21.

The actions and reactions occurring during the beats may also trigger an exit event to occur, after which a next scene is determined at step S2 as set forth at FIGS. 12–13. An exit event is some event or action that signifies the completion of a scene, the abandonment of the scene, or the selection of an alternative story by the user to which the PNA is uniquely assigned in accord with the preferred embodiment.

In either the case where a transition or an exit event occurs, the current scene continues while the PNA either updates the current scene plan at step S22, or plans the next scene beginning at step S2. In a preferred embodiment, simultaneous action by the PNA allows for smooth transitions between scenes. After a last beat ends, the scene components are released at step S23 and control is passed to a next scene at step S24.

Figure 17:
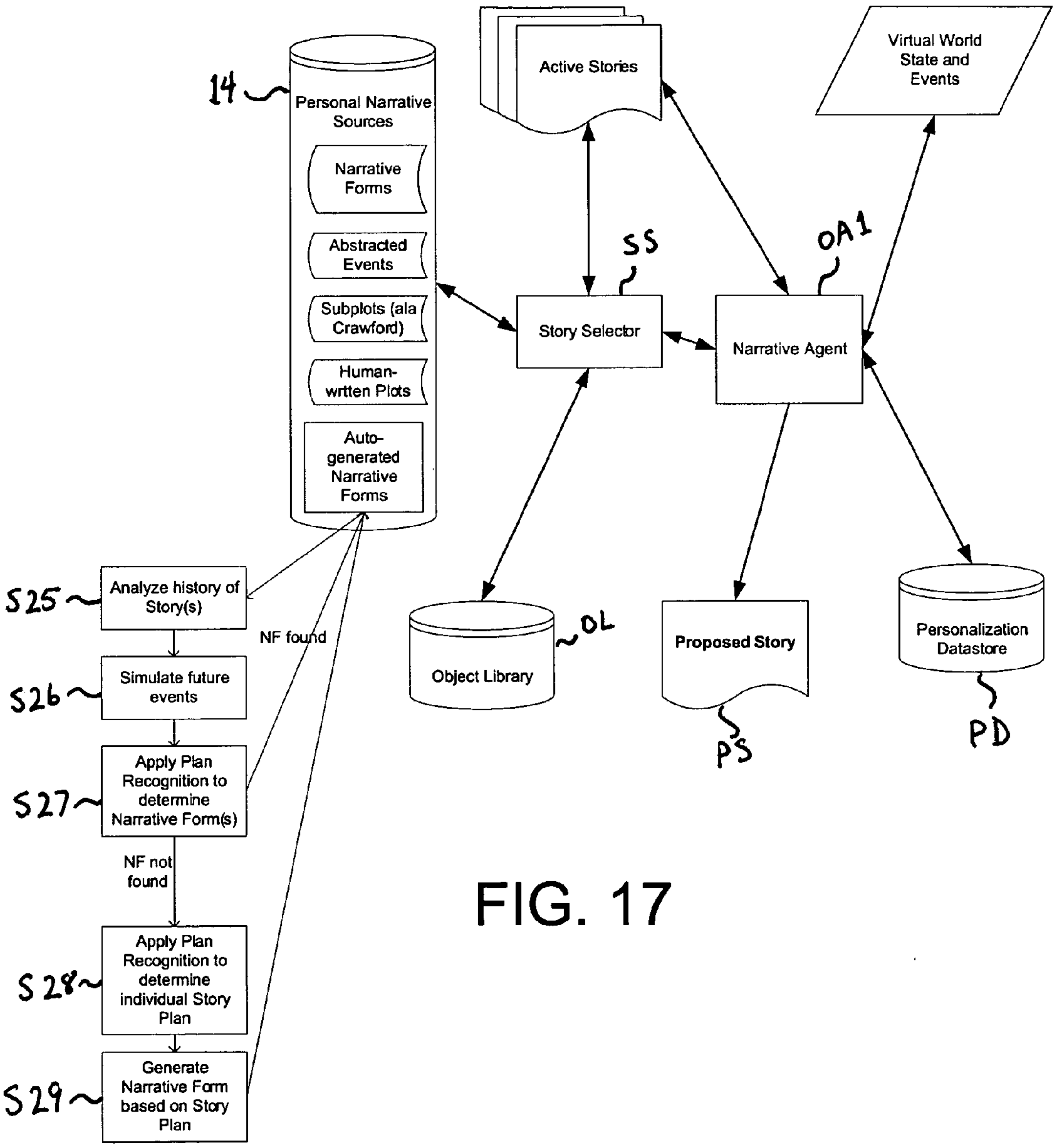
FIG. 17 illustrates narrative agent generation of a proposed story in accord with a preferred embodiment.

As referred to above in the discussion relating to step S7 of FIG. 13, a PNA will generate new stories upon instantiation at step S1 or when more stories are needed for offering story opportunities at step S11. Referring to FIG. 17, a PNA uniquely assigned to a user, such as Lisa's narrative agent OA1 in the above example, and a story selector AS work hand-in-hand to create new stories customized for a player or user such as Lisa. When the PNA determines that there is the need or desire for a new story, the PNA preferably passes the request to the story selector AS, along with information relating the user's preferences and the current state of the virtual world, and perhaps other information that the PNA is maintaining.

In a preferred embodiment, the story selector AS selects a narrative form, a few major characters and abstracted events from a datasource of personal narrative sources 14, and dynamically generates an outline plot and passes it to the PNA, whereby the PNA then instantiates a new story. In alternative embodiments, the story selector AS could select from subplots such as are described at U.S. Pat. No. 5,604,855 to Chris Crawford, mentioned above, or from plots completely written by humans, or from auto-generated plots driven by theme and character simulation.

In the latter case, a plot may be auto-generated by the story selector AS or PNA from the auto-generated narrative forms of the personal narrative sources 14 by analyzing a history of stories, simulating future events and applying plan recognition to determine narrative forms, according to steps S25–S27 shown in FIG. 17. If a narrative form is not found, then plan recognition may be applied to determine an individual story plan at step S28, and a narrative form based on the story plan generated at step S29. The story selector AS may also pull objects from an object library OL.

In a preferred embodiment, the PNA OA1 continues to fill in or alter details of the story as the player or user proceeds through this and related stories. That is, the plot may not be completed immediately, but rather is filled out in real time as the player or user progresses. In an alternative embodiment, the story selector AS may retrieve or generate the entire plot outline before the story begins, e.g., based on abstracted events, subplots, and/or human written plots from the datasource of personal narrative sources 14.

Each of the story selector AS and PNA OA1 may pull information from active stories or as understood from the state of the environment (e.g., the virtual world) and events or from a personalization datastore PD. In this way, the new story may be created for the user as set forth at FIG. 17.

Figure 18:
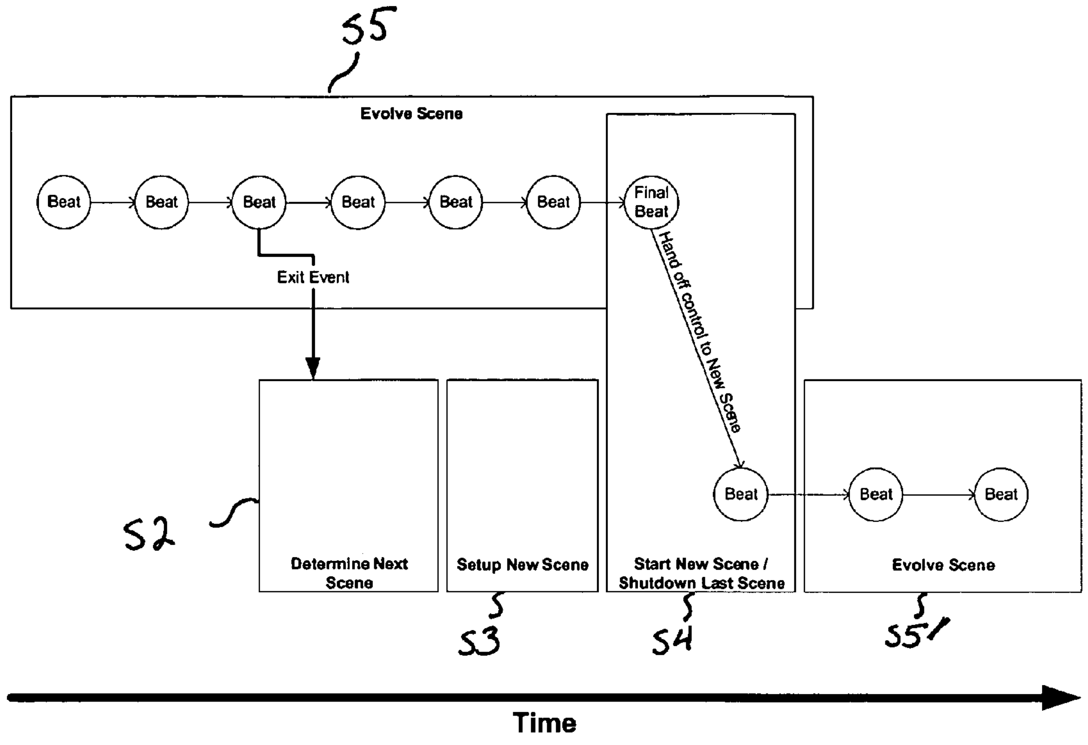
FIG. 18 illustrates a timeline for scene transition in accord with a preferred embodiment.

FIG. 18 illustrates a timeline for scene transition in accord with a preferred embodiment. The time series of FIG. 18 shows in more detail the possibility for simultaneous action of the PNA according to a preferred embodiment. As shown, a scene may be evolving according to the discussion above with reference to FIGS. 12 and 16 at step S5. Once an exit event has been triggered, the PNA begins to determine and prepare the next scene at steps S2 and S3, respectively, while at the same time continuing to evolve the next scene at step S5. At a final beat of the scene being evolved at step S5, control is handed off to the new scene at step S4. The new scene is then evolved at step S5' as shown in FIG. 18. Alternative embodiments, where planning activity occurs following a previous scene, also exist and are fully compatible with the architecture of a preferred PNA.

Figure 19:
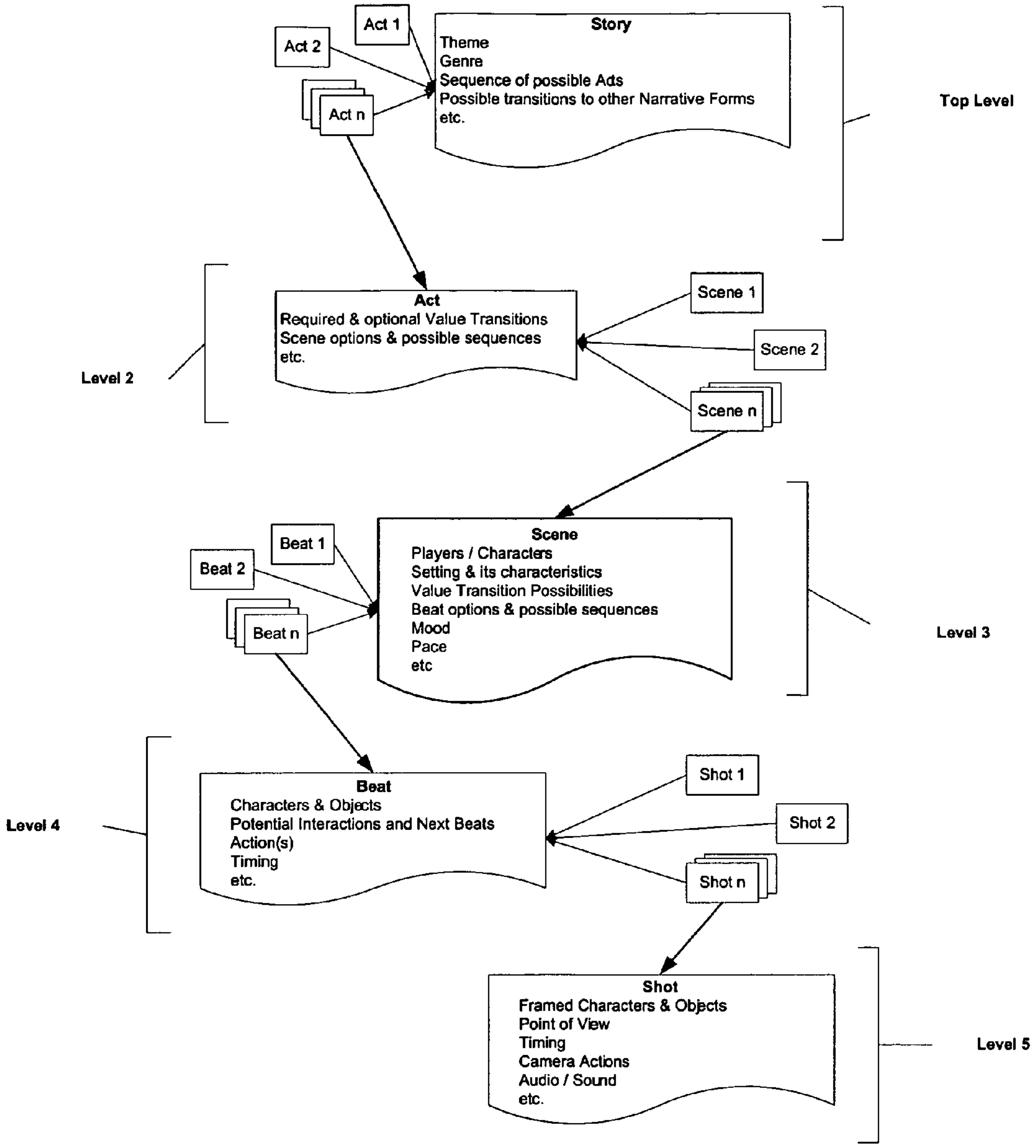
FIG. 19 illustrates an anatomy of a narrative form in accord with a preferred embodiment.

FIG. 19 illustrates the anatomy of a narrative form in accord with a preferred embodiment. The narrative form's top level, a story grammar defines the progression of a story arc through all of its stages (see FIG. 20 below which summarizes the lifetime of the story state machine). Story grammar generates individual stories and defines a sequence of potential acts, e.g., introduction, complication, climax, resolution, etc. The story may be identified by its theme, genre, sequence of potential acts, possible transitions to other narrative forms, etc.

At the second level, act grammar generates individual acts and defines a sequence of potential scenes. Stories comprise acts, each of which has its own grammar comprising scenes. Acts include required and optional value transitions, and scene options and possible sequences.

At the third level, scene grammar generates individual scenes and defines a sequence of potential beats. Scenes definitions include players and characters, the setting and its characteristics, value transition possibilities, beat options and possible sequences, mood, pace, etc. Scenes have a grammar as well, describing the beats, or action/reaction possibilities that drive a scene, and their pacing and abstracted content.

At the fourth level, beat grammar generates individual beats and defines a sequence of potential shots. Beats describe characters and objects, potential interactions and next beats, actions, timing, etc. The sequence of shots are the dramatic unit that drives the presentation of a story to the player or user second by second. At the fifth level, shot grammar generates individual shots. Shots include framed characters and objects, point of view, timing, camera actions, audio/sound, etc.

In a preferred embodiment, each level of grammar maintains wide variability, defining rules that allow a PNA uniquely assigned to a user or player to select from among many possibilities on the fly to manage its user's experience of a story. Other embodiments can collapse variability at one or more levels of this multi-tiered grammar, allowing for severely restricted or pre-written elements at any particular level.

Figure 20:
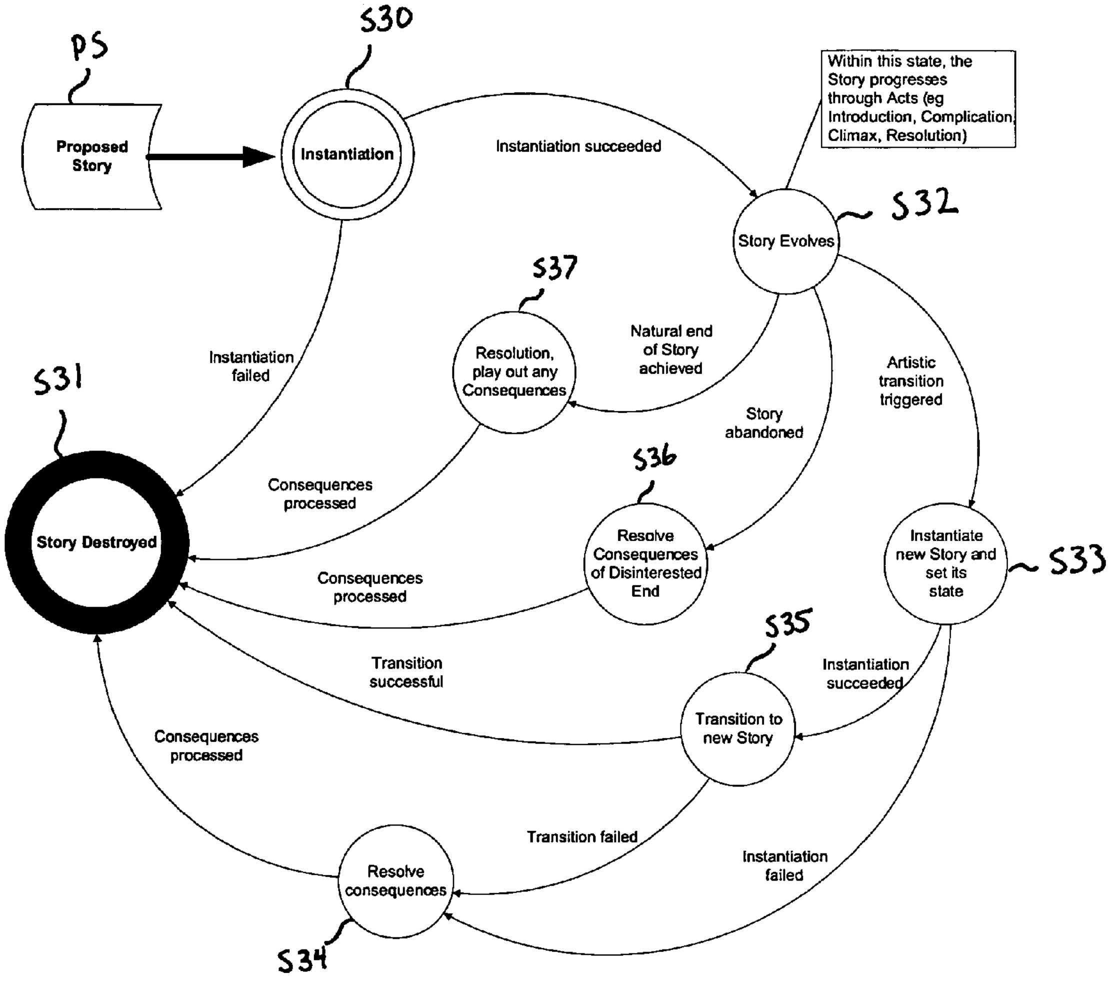
FIG. 20 illustrates story evolution and state machine in accord with a preferred embodiment.

FIG. 20 illustrates story evolution and the story state machine in accord with a preferred embodiment. Each story is based on a narrative form. Upon instantiation, a story of a user begins to evolve, progressing through a number of acts under the guidance of the PNA uniquely assigned to the user. Users can follow a story through to its natural resolution, abandon the story (and accept the consequences), or make choices that morph the story into an instance of a related narrative form by triggering an artistic transition defined within the story.

Referring now to FIG. 20, a proposed story PS based on a narrative form (as described in the discussion of FIG. 4) is instantiated at step S30. The story is destroyed at step S31 if the instantiation fails. If the instantiation succeeds, then the story evolves at step S32. At step S32, the story progresses through acts (e.g., introduction, complication, climax, resolution). From step S32, an artistic transition may be triggered, at which point a new story would be instantiated and its state set based on the state of the previous story at step S33. If instantiation of the new story fails, then the consequences are resolved at step S34 and processed, and the story is destroyed at step S31.

If instantiation of the new story succeeds, then transition to the new story occurs at step S35. If the transition fails, then the consequences are resolved at step S34 and processed, and the story is destroyed at step S31. If the transition succeeds, then the initial story is destroyed at step S31 without resolving consequences at step S34. If a story that is evolving at step S32 is abandoned, then consequences of disinterested end are resolved at step S36 and processed, and the story is destroyed at step S31.

If a story that has evolved at step S32 achieves its natural end, then resolution and playing out of any consequences occurs at step S37. The consequences are processed and the story is destroyed at step S31.

Figure 2:
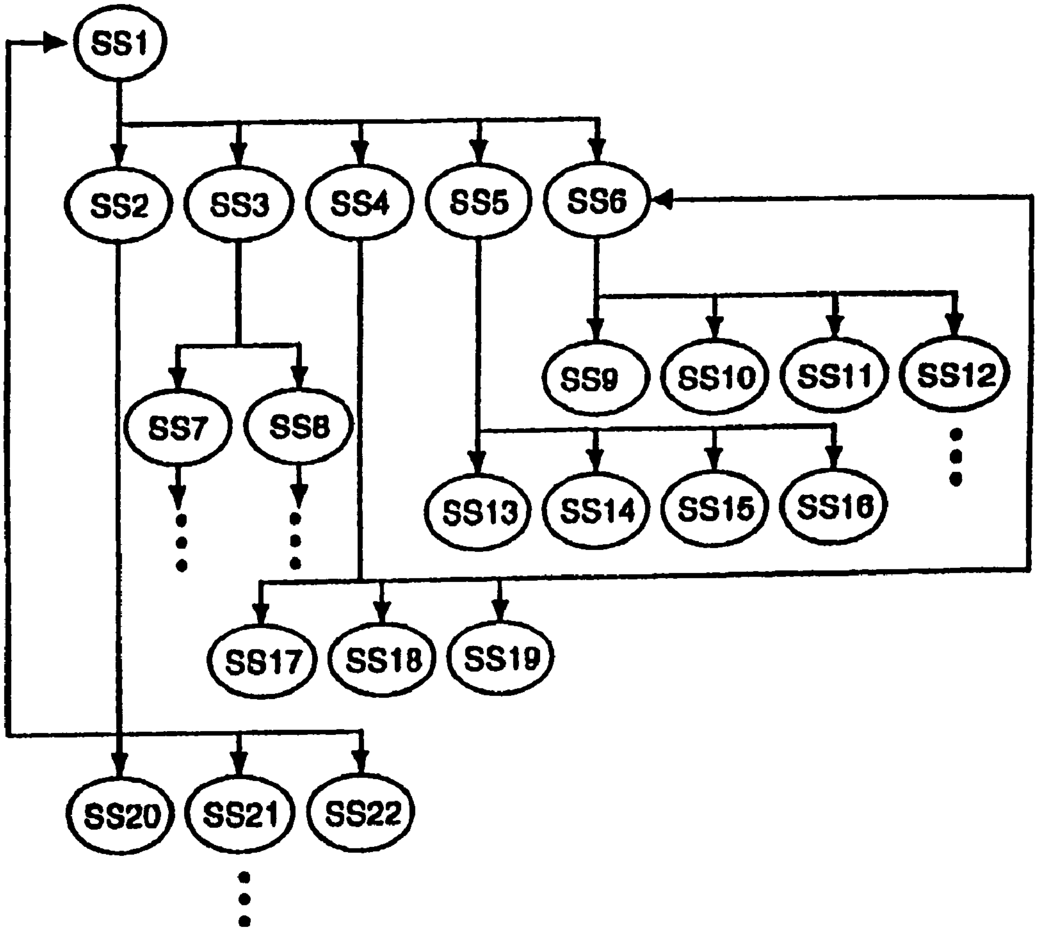
FIG. 2 (PRIOR ART)
FIG. 2 schematically illustrates the simulation approach to interactive narrative.
Figure 3:
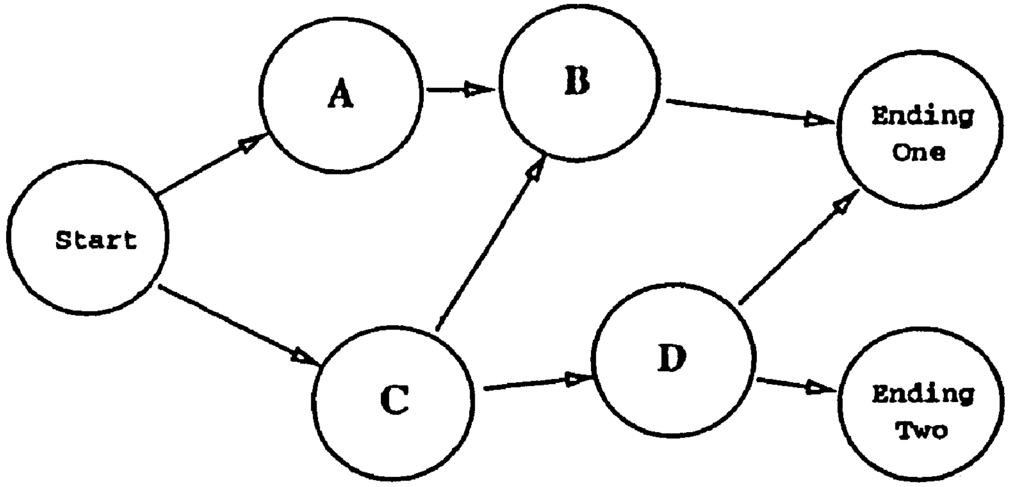
FIG. 3 (PRIOR ART)
FIG. 3 schematically illustrates a nodal architecture approach to interactive narrative.
Figure 21:
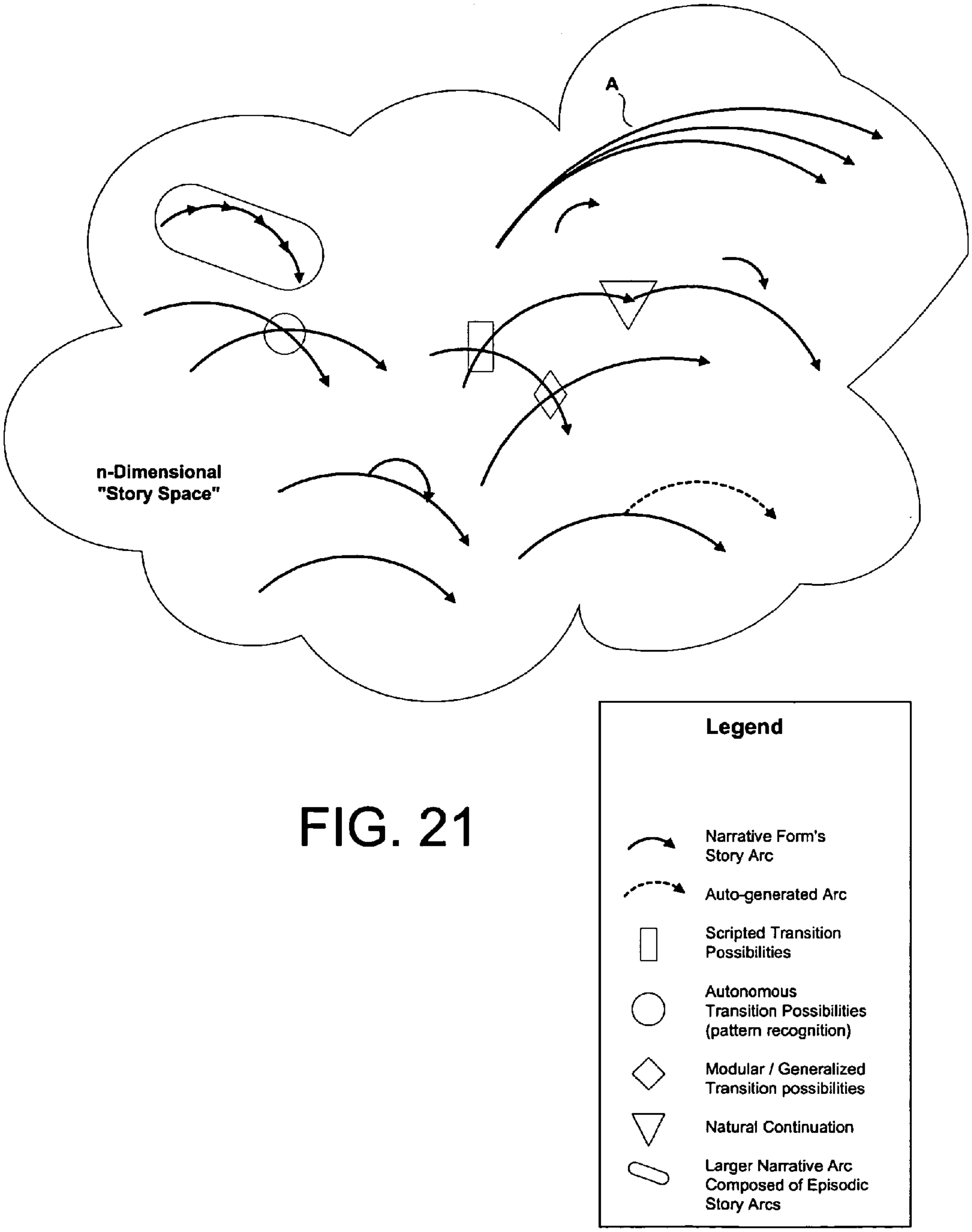
FIG. 21 illustrates relationships among narrative forms in accord with a preferred embodiment.

FIG. 21 illustrates relationships among narrative forms in accord with a preferred embodiment. Narrative forms are abstract descriptions of dramatic story arcs, existing in n-dimensional story space. Conceptually, some narrative forms are more closely related to one another than others. for example, a buddy story and a betrayal story are quite similar, with the difference revolving around a single major value transition. The architecture of narrative forms and the PNA uniquely assigned to each user enables users to have true agency in the development of their stories, without the unmanageable complexity of infinitely branching story lines. This is in contrast to prior art (see discussion of FIGS. 2 and 3 above).

The PNA uniquely assigned to each user can use several techniques to manage the progression of stories for its user. Some of these techniques include: (1) narrative forms that incorporate simple branching (see three-pronged branching labeled (A) in FIG. 21); (2) auto-generation of new story arcs when players or users choose to split off from a defined narrative form (see dashed line arc in FIG. 21); (3) natural continuation of one narrative form into another, upon completion of the first (as a decision aid for the story selector) (see transition marked by a triangular symbol in FIG. 21); (4) scripted transition possibilities, where human authors have defined particular value transitions within a story that can morph it into a different narrative form (see transition marked by a rectangular symbol in FIG. 21); (5) autonomous transition possibilities, wherein the PNA uses plan recognition to determine that a player or user intends to pursue a different narrative form, whereby upon recognition, the PNA can change the story into that narrative form on the fly (see transition marked by circular symbol in FIG. 21); (6) modular (generalized) transition possibilities, whereby narrative form definitions include the logical parameters by which other narrative forms can relate to them, without necessarily referring or linking to those other narrative forms specifically (see transition marked at square or diamond symbol in FIG. 21); and (7) larger narrative arcs, whereby story arcs can form episodes of a much larger story (see transitions marked at oval symbol in FIG. 21).

Figure 22:
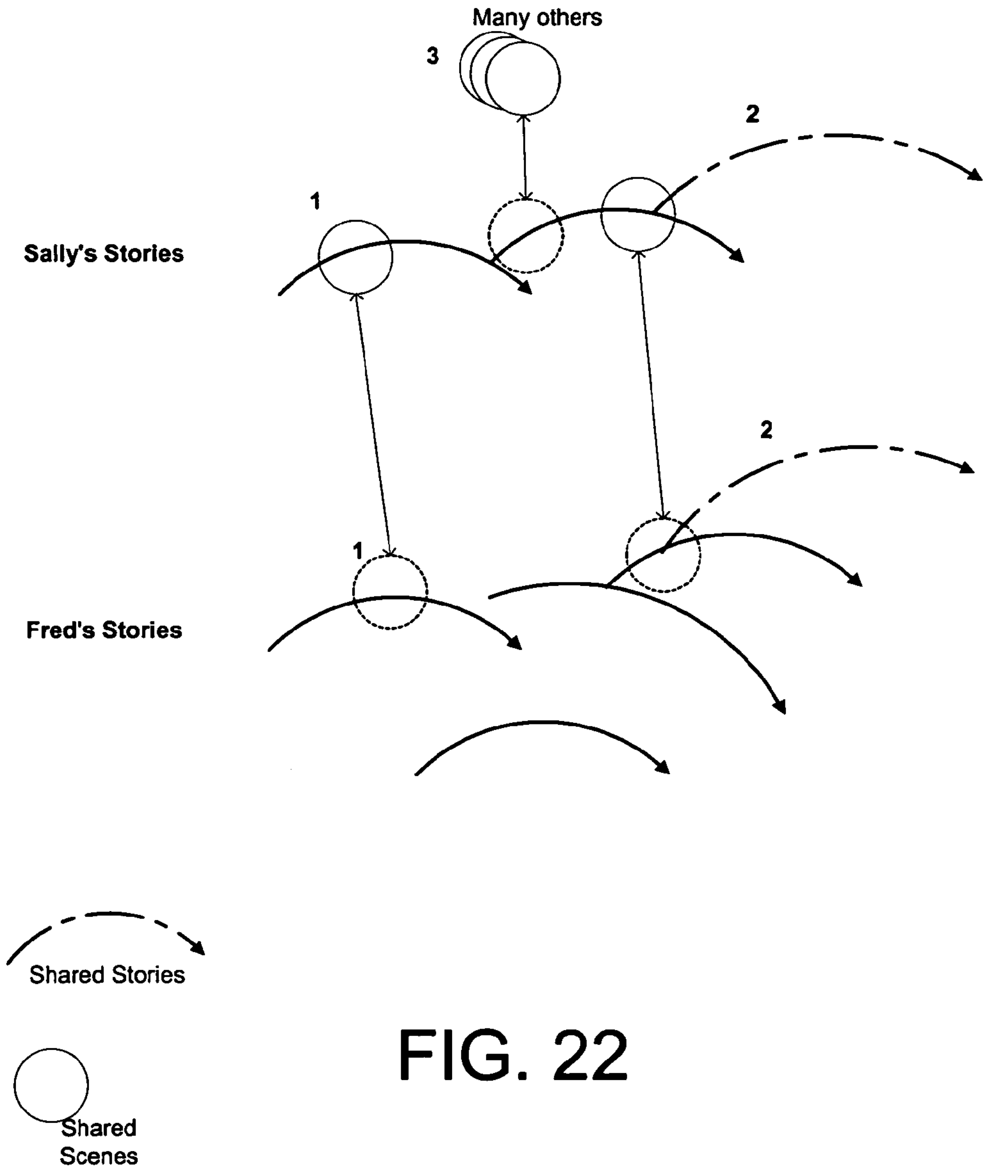
FIG. 22 illustrates sharing of stories by multiple players in accord with a preferred embodiment.

FIG. 22 illustrates sharing of stories by multiple players or users in accord with a preferred embodiment. Users can play roles in one another's stories in accord with the preferred embodiment. FIG. 22 shows story arcs representing Sally's and Fred's stories. Shared scenes are marked by circles and shared stories are denoted with dashed arcs in FIG. 22. In some cases (see 1 in FIG. 22), each of Sally and Fred plays a role in the other's story. In other cases, this type of interaction can lead the users to share an entire story (see 2 in FIG. 22). This cross-user interaction need not be limited to two people, but could involve many (see 3 in FIG. 22). In all cases, each user's uniquely assigned PNA negotiates with the other users' PNAs to generate the combined scenes and stories, as discussed above with reference to FIG. 6.

In short, the preferred embodiments set forth above describe a system for providing interactive narrative wherein multiple stories may be simultaneously managed by a personal narrative agent uniquely assigned to a single user, wherein each of those stories may progress to a narrative conclusion either independent of or inter-related with each other. A system has also been described above wherein multiple users each have a uniquely assigned personal narrative agent which manages the story experiences of the user to which it is assigned. Each personal narrative agent maintains data relating to its user and interacts with the environment and objects and characters therein, as well as with other narrative agents assigned to other users, to further the narrative progression of the stories involving the user. Each user in a multiple user environment thus may pursue their own individual stories independently from the stories of the other users, whether or not the user chooses to interact with any particular other user.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

The invention claimed is:

1. A software application stored on an information storage medium including a personal narrative agent having instructions, which when executed cause one or more processors to create and manage multiple dynamic customized story experiences for a subject user in a user-observable environment having at least one object with which the subject user may interact, by performing the steps of:

selectively interacting with said at least one object to manipulate the environment in furtherance of the story experiences;

maintaining data relating to the subject user, the environment and the multiple story experiences of the subject user; and simultaneously managing each of said multiple story experiences each pf which reaches its own narrative conclusion consistent with input and characteristics of the subject user and any objects selected to influence said story experiences.

2. The software application of claim 1, the one or more processors permitting the personal narrative agent to perform the further step of maintaining an awareness of possible story opportunities for the subject user, activities which could trigger those stories from those opportunities, and activities which could advance those stories.

3. The software application of claim 2, the one or more processors permitting the personal narrative agent to perform the further step of maintaining an awareness of possible objects that could trigger and/or advance those stories.

4. The software application of claim 3, wherein the possible objects include a character corresponding to a second user.

5. The software application of claim 1, the one or more processors permitting the personal narrative agent to perform the further steps of:

maintaining a personal datastore of information relating preferences of the subject user; and offering a story opportunity to the subject user based on information of said personal datastore.

6. The software application of claim 1, the one or more processors permitting the personal narrative agent to perform the further steps of:

monitoring the activities of the subject user; and offering a story opportunity to the subject user based on information gathered from said monitoring of said activities of the subject user.

7. The software application of claim 6, the one or more processors permitting the personal narrative agent to perform the further step of storing data about user activities.

8. The software program of any of claims 5 or 6, wherein said information is further used for evolving a story.

9. The software application of claim 1, further including a second personal narrative agent for providing instructions to one or more processors to create and manage one or more dynamic customized story experiences for a second user in said user-observable environment having said at least one object with which the second user may interact, the one or more processors permitting the second personal narrative agent to perform the steps of: selectively interacting with said at least one object to manipulate the environment in furtherance of the story experiences of the second user; maintaining data relating to the second user, the environment and the story experiences of the second user; and simultaneously managing each of said story experiences of said second user independent of said story experiences of said subject user, and each of which reaches its own narrative conclusion consistent with input and characteristics of the second user and any objects selected to influence said story experiences of said second user, to enable said second user to pursue individual stories independent from the stories of the first user.

10. The software application of claim 9, the one or more processors permitting the personal narrative agent of the subject user to perform the further step of negotiating a story opportunity involving said second user for the subject user with said second personal narrative agent uniquely assigned to the second user consistent with said one or more story experiences of said subject user.

11. The software application of claim 9, the one or more processors permitting the personal narrative agent of the subject user to perform the further step of negotiating for use of one or more objects with said second personal narrative agent uniquely assigned to said second user, said objects being used in one or more story experiences of one or both of said subject and second users.

12. The software application of claim 11, wherein a market mechanism is used to determine an outcome of the negotiation.

13. The software application of claim 12, wherein said market mechanism includes bidding for the objects to determine a value of the objects.

14. The software application of any of claims 11, 12, or 13, wherein said negotiation includes receiving input from one or both of the subject and second users.

15. The software application of claim 9, the one or more processors permitting each personal narrative agent to perform the further steps of modifying the presentation of the environment to its respective user to further said one or more story experiences.

16. The software application of claim 9, the one or more processors permitting the personal narrative agent to perform the further step of modifying the environment to further said story experiences.

17. The software application of claim 1, the one or more processors permitting the personal narrative agent to perform the further step of negotiating a story opportunity involving a second user for the subject user with a second personal narrative agent uniquely assigned to the second user consistent with said one or more story experiences.

18. The software application of any of claims 10 or 17, wherein said second personal narrative agent performs the further step of negotiating a story opportunity involving a third user for the second user with a third personal narrative agent uniquely assigned to the third user, consistent with said one or more story experiences of said second user and said one or more story experiences of said subject user.

19. The software application of claim 1, the one or more processors permitting the personal narrative agent to perform the further step of negotiating for use of one or more objects with a second personal narrative agent uniquely assigned to a second user, said objects being used in one or more story experiences of one or both of said subject and second users.

20. The software application of claim 19, wherein a market mechanism is used to determine an outcome of the negotiation.

21. The software application of claim 20, wherein said market mechanism includes bidding for the objects to determine a value of the objects.

22. The software application of any of claims 19, 20, or 21, wherein said negotiation includes receiving input from one or both of the subject and second users.

23. The software application of claim 1, the one or more processors permitting the personal narrative agent to perform the further step of managing scenes.

24. The software application of claim 23, the one or more processors permitting the personal narrative agent to perform the further step of managing transitions between scenes.

25. The software application of claim 24, the one or more processors permitting the personal narrative agent to perform the further step of managing transitions between scenes where the last scene and the next scene are in different stories.

26. The software application of claim 25, wherein said stories are elements of a larger narrative arc.

27. The software application of claim 23, the one or more processors permitting the personal narrative agent to perform the further step of managing scenes which further more than one story experience within a single scene, thereby weaving said story experiences together.

28. The software application of claim 1, the one or more processors permitting the personal narrative agent to perform the further step of modifying the presentation of the environment to the user to further said story experiences.

29. The software application of claim 1, the one or more processors permitting the personal narrative agent to perform the further step of modifying the environment to further said story experiences.

30. The software application of claim 1, further including a second personal narrative agent for providing instructions to one or more processors to create and manage one or more dynamic customized stories for a computer-controlled character in said user-observable environment having said at least one object with which the computer-controlled character may interact, the one or more processors permitting the second personal narrative agent to perform the steps of: selectively interacting with said at least one object to manipulate the environment in furtherance of the stories; maintaining data relating to the computer-controlled character, the environment and the stories of the computer-controlled character; and simultaneously managing each of said stories of said computer-controlled character independent of said stories of said first user, each of which reaches its own narrative conclusion consistent with input and characteristics of the computer-controlled character and any objects selected to influence said stories of said computer-controlled character, to enable said computer-controlled character to pursue stories independent from the stories of the first user.

31. The software application of claim 30, the one or more processors permitting the second personal narrative agent to perform the further step of reverting computer-control of the computer-controlled character to control by a second user, wherein said character continues to pursue one or more story experiences previously controlled by computer- control.

32. The software application of claim 1, wherein a character object represents said subject user in the environment, the one or more processors permitting the personal narrative agent to perform the further step of reverting control by said subject user of the character object to computer control, wherein said character object continues to pursue one or more story experiences previously controlled by the subject user.

33. The software application of claim 1, wherein a first character object represents said subject user in the environment, and wherein a second character object represents a second user in the environment, and said second character object is controlled and managed by said second user, said second character object not being associated with a second personal narrative agent.

34. The software application of claim 1, the one or more processors permitting the personal narrative agent to perform the further steps of:

recognizing story patterns in actions of said subject user; and creating and managing story experiences consistent with those patterns.

35. The software application of claim 34, the one or more processors permitting the personal narrative agent to perform the further step of maintaining consistency of said story experiences with a previous active story.

36. The software application of claim 1, the one or more processors permitting the personal narrative agent to perform the further step of creating stories based on narrative forms, said narrative forms defining structures and themes of said stories.

37. The software application of claim 36, the one or more processors permitting the personal narrative agent to perform the further step of creating multiple distinct stories based on multiple narrative forms.

38. The software application of claim 36, the one or more processors permitting the personal narrative agent to perform the further step of transforming a story based on a first narrative form into a story based on a second narrative form.

39. The software application of claim 38, wherein a link defining a transition possibility between said first narrative form and said second narrative form is modular.

40. The software application of claim 36, the one or more processors permitting the personal narrative agent to perform the further step of creating multiple distinct stories based on a single narrative form.

41. A software application stored on an information storage medium having instructions, which when executed cause one or more processors to create and manage one or more dynamic customized story experiences for each of multiple users wherein a unique personal narrative agent is assigned to assist each user throughout the story experiences of the user in a user-observable environment having at least one object with which the users may interact, by performing the steps of:

selectively interacting with said at least one object and a second personal narrative agent which is assigned to a second user to manipulate the environment in furtherance of said one or more story experiences, including negotiating a story opportunity involving a second user for the first user with said second personal narrative agent consistent with said one or more story experiences;

maintaining data relating to the first user, the one or more story experiences of the first user, and the environment; and managing said one or more story experiences to a narrative conclusion consistent with input and characteristics of the first user and any objects selected to influence said one or more story experiences.

42. The software application of claim 41, the one or more processors permitting the personal narrative agent of the subject user to perform the further step of negotiating for use of said at least one object with said second personal narrative agent uniquely assigned to said second user, said at least one object being used in one or more story experiences of one or both of said subject and second users.

43. The software application of claim 42, wherein a market mechanism is used to determine an outcome of the negotiation.

44. The software application of claim 43, wherein said market mechanism includes bidding for the objects to determine a value of the objects.

45. The software application claim 44, wherein said negotiation includes receiving input from one or both of the subject and second users.

46. The software application claim 43, wherein said negotiation includes receiving input from one or both of the subject and second users.

47. The software application claim 42, wherein said negotiation includes receiving input from one or both of the subject and second users.

48. A software application stored on an information storage medium having instructions, which when executed cause one or more processors to create and manage one or more dynamic customized story experiences for each of multiple users wherein a unique personal narrative agent is assigned to assist each user throughout the story experiences of the user in a user-observable environment having at least one object with which the users may interact, by performing the steps of:

selectively interacting with said at least one object and a second personal narrative agent which is assigned to a second user to manipulate the environment in furtherance of said one or more story experiences, including negotiating for use of one or more objects with said second personal narrative agent, said objects being used in one or more story experiences of one or both of said first and second users;

maintaining data relating to the first user, the one or more story experiences of the first user, and the environment; and managing said one or more story experiences to a narrative conclusion consistent with input and characteristics of the first user and any objects selected to influence said one or more story experiences.

49. The software application of any of claims 9, 41, or 48, the one or more processors permitting the personal narrative agent to perform the further step of maintaining an awareness of possible story opportunities for the subject user, activities which could trigger those stories from those opportunities, and activities which could advance those stories.

50. The software application of claim 49, the one or more processors permitting the personal narrative agent to perform the further step of maintaining an awareness of possible objects that could trigger and/or advance those stories.

51. The software application of claim 50, wherein the possible objects include a character corresponding to a second user.

52. The software application of any of claims 9, 41, or 48, the one or more processors permitting the personal narrative agent to perform the further steps of:

maintaining a personal datastore of information relating preferences of the subject user; and offering a story opportunity to the subject user based on information of said personal datastore.

53. The software program of claim 52, wherein said information is further used for evolving a story.

54. The software application of any of claims 9, 41, or 48, the one or more processors permitting the personal narrative agent to perform the further steps of:

monitoring the activities of the subject user; and offering a story opportunity to the subject user based on information gathered from said monitoring of said activities of the subject user.

55. The software application of claim 54, the one or more processors permitting the personal narrative agent to perform the further step of storing data about user activities.

56. The software program of claim 54, wherein said information is further used for evolving a story.

57. The software application of claim 48, the one or more processors permitting the personal narrative agent of the subject user to perform the further step of negotiating a story opportunity involving said second user for the subject user with said second personal narrative agent uniquely assigned to the second user consistent with said one or more story experiences of said subject user.

58. The software application of claim 57, wherein said second personal narrative agent performs the further step of negotiating a story opportunity involving a third user for the second user with a third personal narrative agent uniquely assigned to the third user, consistent with said one or more story experiences of said second user and said one or more story experiences of said subject user.

59. The software application of claim 48, wherein a market mechanism is used to determine an outcome of the negotiation.

60. The software application of claim 59, wherein said market mechanism includes bidding for the objects to determine a value of the objects.

61. The software application of claim 60, wherein said negotiation includes receiving input from one or both of the subject and second users.

62. The software application of claim 59, wherein said negotiation includes receiving input from one or both of the subject and second users.

63. The software application of claim 48, wherein said negotiation includes receiving input from one or both of the subject and second users.

64. The software application of any of claims 9, 41, or 48, the one or more processors permitting the personal narrative agent to perform the further step of managing scenes.

65. The software application of claim 64, the one or more processors permitting the personal narrative agent to perform the further step of managing transitions between scenes.

66. The software application of claim 65, the one or more processors permitting the personal narrative agent to perform the further step of managing transitions between scenes where the last scene and the next scene are in different stories.

67. The software application of claim 66, wherein said stories are elements of a larger narrative arc.

68. The software application of claim 64, the one or more processors permitting the personal narrative agent to perform the further step of managing scenes which further more than one story experience within a single scene, thereby weaving said story experiences together.

69. The software application of any of claims 41, or 48, the one or more processors permitting each personal narrative agent to perform the further steps of modifying the presentation of the environment to its respective user to further said one or more story experiences.

70. The software application of any of claims 41, or 48, the one or more processors permitting the personal narrative agent to perform the further step of modifying the environment to further said story experiences.

71. The software application of any of claims 1, 9, 41, or 48, the one or more processors permitting each personal narrative agent to perform the further step of creating and managing one or more of said stories consistent with one or more larger narrative arcs.

72. The software application of any of claims 1, 9, 41, or 48, the one or more processors permitting each personal narrative agent to perform the further steps of:

storing the state of said stories; and restoring said stories from their saved state.

73. The software application of any of claims 1, 9, 41, or 48, the one or more processors permitting each personal narrative agent to perform the further step of managing one or more stories for multiple users.

* * * * *